(12) United States Patent
Carre et al.

(10) Patent No.: US 12,223,313 B2
(45) Date of Patent: *Feb. 11, 2025

(54) USER INTERFACE FOR ON-DECK CAPABILITIES

(71) Applicant: Oracle International Corporation, Redwood Shores, CA (US)

(72) Inventors: Arthur Carre, Seattle, WA (US); Igor Vasilev, Ottawa (CA)

(73) Assignee: Oracle International Corporation, Redwood Shores, CA (US)

( * ) Notice: Subject to any disclaimer, the term of this patent is extended or adjusted under 35 U.S.C. 154(b) by 167 days.

This patent is subject to a terminal disclaimer.

(21) Appl. No.: 18/073,435

(22) Filed: Dec. 1, 2022

(65) Prior Publication Data

US 2023/0251851 A1 Aug. 10, 2023

Related U.S. Application Data

(60) Provisional application No. 63/347,278, filed on May 31, 2022, provisional application No. 63/314,976, filed on Feb. 28, 2022, provisional application No. 63/312,814, filed on Feb. 22, 2022, provisional application No. 63/308,003, filed on Feb. 8, 2022.

(51) Int. Cl.
*G06F 8/70* (2018.01)
*G06F 9/451* (2018.01)

(52) U.S. Cl.
CPC ............... *G06F 8/70* (2013.01); *G06F 9/451* (2018.02)

(58) Field of Classification Search
CPC .......................................................... G06F 8/70
USPC .......................................................... 717/120
See application file for complete search history.

(56) References Cited

U.S. PATENT DOCUMENTS

| | | | |
|---|---|---|---|
| 10,972,367 B2 * | 4/2021 | Subramani Nadar | ........................ G06F 9/5055 |
| 11,212,171 B1 * | 12/2021 | Ozkan | ..................... G06F 9/453 |
| 11,397,619 B2 * | 7/2022 | Barsalou | ................. G06F 9/505 |
| 11,934,885 B2 * | 3/2024 | Guchhait | .............. G06F 9/5083 |

(Continued)

OTHER PUBLICATIONS

International Application No. PCT/US2023/012324, International Search Report and Written Opinion mailed on May 3, 2023, 12 pages.

(Continued)

*Primary Examiner* — Francisco J Aponte
(74) *Attorney, Agent, or Firm* — Kilpatrick Townsend & Stockton LLP

(57) ABSTRACT

The present embodiments relate to identifying and tracking capabilities within a data center managed by a cloud infrastructure orchestration service (CIOS). The CIOS can generate visualization(s) for the capabilities of the CIOS. A first portion of a visualization can identify capabilities that depend on previously published capabilities A second portion of the visualization can provide capabilities with one or more unpublished capabilities. In some embodiments, the capabilities depicted as part of the visualization can be arranged by a ranking derived based at least in part on a number of other capabilities publishing of a given capability blocks and/or a number of capabilities on which publishing a given capability depends. The visualization can be used to allocate resources to efficiently publish capabilities and build new regions (e.g., new data centers) with the CIOS.

20 Claims, 17 Drawing Sheets

(56) References Cited

U.S. PATENT DOCUMENTS

| | | | |
|---|---|---|---|
| 2014/0317166 A1* | 10/2014 | Iyoob | H04L 41/5054 |
| | | | 709/201 |
| 2016/0197980 A1* | 7/2016 | Durairajan | H04L 41/0895 |
| | | | 709/223 |
| 2017/0207968 A1* | 7/2017 | Eicken | H04L 67/01 |
| 2017/0228227 A1 | 8/2017 | Winterfeldt et al. | |
| 2019/0122156 A1* | 4/2019 | Asthana | G06F 7/026 |
| 2019/0190796 A1* | 6/2019 | Asthana | H04L 41/5048 |
| 2020/0014607 A1* | 1/2020 | Gangadhar | H04L 67/34 |
| 2020/0186416 A1* | 6/2020 | Hashimoto | G06F 8/60 |
| 2020/0186424 A1* | 6/2020 | Hashimoto | G06F 9/44505 |
| 2021/0055917 A1* | 2/2021 | Khakare | G06F 3/0482 |
| 2021/0144517 A1* | 5/2021 | Guim Bernat | H04L 41/0869 |
| 2021/0223923 A1 | 7/2021 | Carre et al. | |
| 2021/0227024 A1* | 7/2021 | Glass | G06F 8/71 |
| 2021/0263667 A1* | 8/2021 | Whitlock | G06F 11/3447 |
| 2022/0197773 A1* | 6/2022 | Butler | G06F 9/505 |
| 2022/0382598 A1* | 12/2022 | Szabó | G06F 9/5072 |
| 2022/0391258 A1* | 12/2022 | Szabó | G06F 9/455 |
| 2023/0060675 A1* | 3/2023 | Szabó | G06F 9/5077 |
| 2023/0120379 A1* | 4/2023 | Nassar | G06F 3/0482 |
| | | | 709/204 |
| 2024/0311201 A1* | 9/2024 | Jha | G06F 9/505 |

OTHER PUBLICATIONS

The International Application No. PCT/US2023/011984, "International Search Report and the Written Opinion", mailed May 31, 2023, 12 pages.

International Application No. PCT/US2023/011984, "International Preliminary Report on Patentability", mailed Aug. 22, 2024, 9 pages.

International Application No. PCT/US2023/012324, "International Preliminary Report on Patentability", mailed Aug. 22, 2024, 9 pages.

* cited by examiner

USER INTERFACE FOR ON-DECK CAPABILITIES

CROSS-REFERENCE TO RELATED APPLICATIONS

This non-provisional application claims priority to U.S. Provisional Patent Application No. 63/308,003, filed on Feb. 8, 2022, entitled "Techniques for Bootstrapping a Region Build," U.S. Provisional Patent Application No. 63/312,814, filed on Feb. 22, 2022, entitled "Techniques for Implementing Virtual Data Centers," U.S. Provisional Patent Application No. 63/314,976, filed on Feb. 28, 2022, entitled "User Interface for On-Deck Capabilities in a Data Access Group," and U.S. Provisional Patent Application No. 63/347,278, filed on May 31, 2022, entitled "User Interface for On-Deck Capabilities," the disclosures of which are herein incorporated by reference in their entirety for all purposes.

BACKGROUND

Today, cloud infrastructure services utilize many individual services to build a data center (e.g., to bootstrap various resources in a data center of a particular geographic region). In some examples, a region is a logical abstraction corresponding to a localized geographical area in which one or more data centers are (or are to be) located. Building a data center may include provisioning and configuring infrastructure resources and deploying code to those resources (e.g., for a variety of services). The operations for building a data center may be collectively referred to as performing a "region build." Any suitable number of data centers may be included in a region and therefore a region build may include operations for building multiple data centers. As resources are bootstrapped to the data center, various capabilities may be published to indicate their availability.

Conventional tools for building a region require significant manual effort as bootstrapping operations for one service may depend on other functionality and/or services of the region which may not yet be available. For example, to bootstrap an application, both an object storage application and a cloud identity service may first need to be available in the region. However, in some instances, without the implementation of such dependent resources, the application may be unable to be bootstrapped or have its capabilities published. As the number of service teams and regions grows, the tasks performed for orchestrating provisioning and deployment drastically increase. Substantially relying on manual efforts for bootstrapping services and/or building regions is time intensive, incurs risks, and may not scale well.

BRIEF DESCRIPTION OF DRAWINGS

To easily identify the discussion of any particular element or act, the most significant digit or digits in a reference number refer to the figure number in which that element is first introduced.

DETAILED DESCRIPTION

Figure 1:
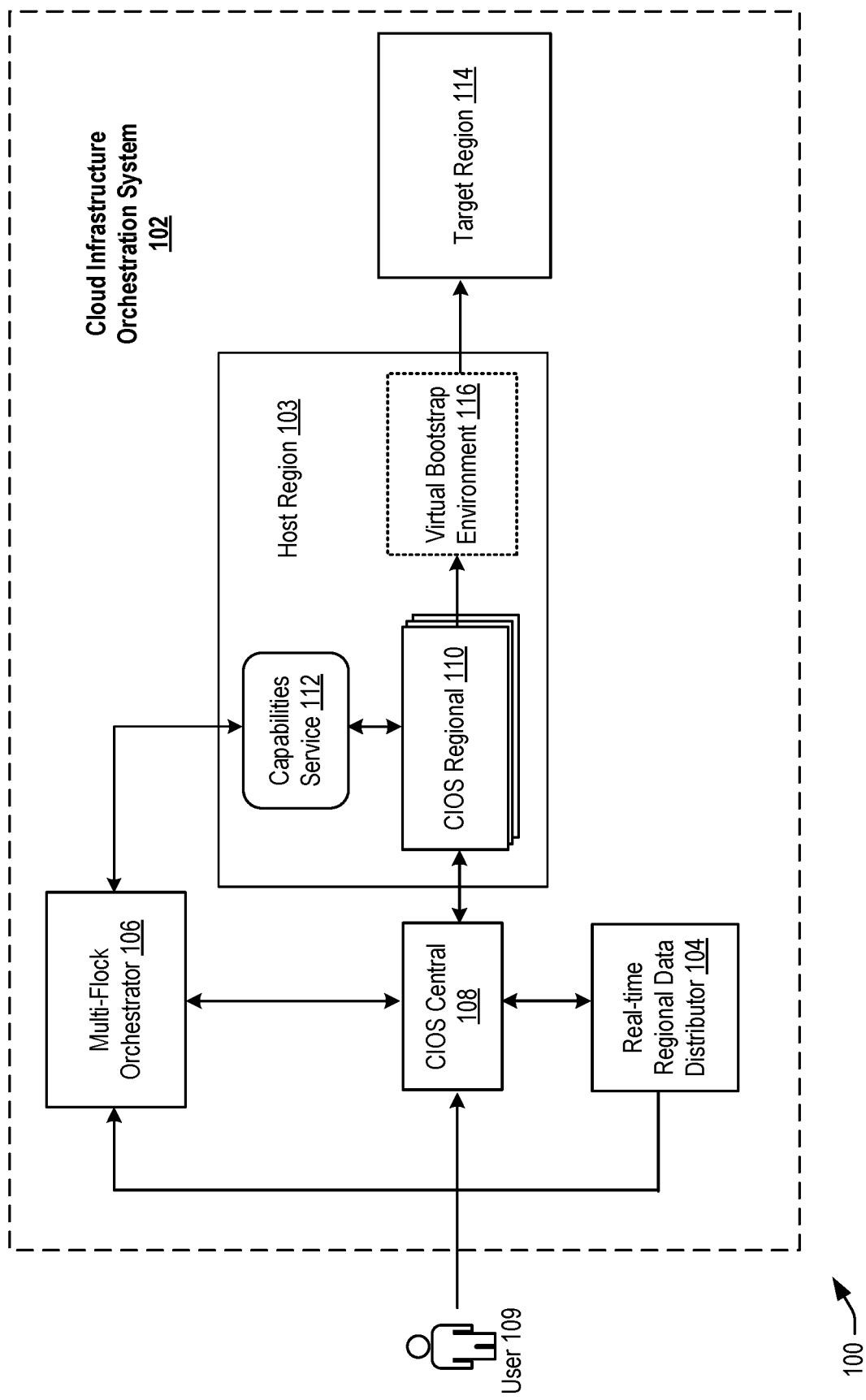
FIG. 1 is a block diagram of an environment in which a Cloud Infrastructure Orchestration Service (CIOS) may operate to dynamically provide bootstrap services in a region, according to at least one embodiment.

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

Example Automated Data Center Build (Region Build) Infrastructure

The adoption of cloud services has seen a rapid uptick in recent times. Various types of cloud services are now provided by various different cloud service providers (CSPs). The term cloud service is generally used to refer to a service or functionality that is made available by a CSP to users or customers on demand (e.g., via a subscription model) using systems and infrastructure (cloud infrastructure) provided by the CSP. Typically, the servers and systems that make up the CSP's infrastructure and which is used to provide a cloud service to a customer are separate from the customer's own on-premise servers and systems. Customers can thus avail themselves of cloud services provided by the CSP without having to purchase separate hardware and software resources for the services. Cloud services are designed to provide a subscribing customer easy, scalable, and on-demand access to applications and computing resources without the customer having to invest in procuring the infrastructure that is used for providing the services or functions. Various different types or models of cloud services may be offered such as Software-as-a-Service (SaaS), Platform-as-a-Service (PaaS), Infrastructure-as-a-Service (IaaS), and others. A customer can subscribe to one or more cloud services provided by a CSP. The customer can be any entity such as an individual, an organization, an enterprise, and the like.

As indicated above, a CSP is responsible for providing the infrastructure and resources that are used for providing cloud services to subscribing customers. The resources provided by the CSP can include both hardware and software resources. These resources can include, for example, compute resources (e.g., virtual machines, containers, applications, processors), memory resources (e.g., databases, data stores), networking resources (e.g., routers, host machines, load balancers), identity, and other resources. In certain implementations, the resources provided by a CSP for providing a set of cloud services CSP are organized into data centers. A data center may be configured to provide a particular set of cloud services. The CSP is responsible for equipping the data center with infrastructure and resources that are used to provide that particular set of cloud services. A CSP may build one or more data centers.

Data centers provided by a CSP may be hosted in different regions. A region is a localized geographic area and may be identified by a region name. Regions are generally independent of each other and can be separated by vast distances, such as across countries or even continents. Regions are grouped into realms. Examples of regions for a CSP may include US West, US East, Australia East, Australia Southeast, and the like.

A region can include one or more data centers, where the data centers are located within a certain geographic area corresponding to the region. As an example, the data centers in a region may be located in a city within that region. For example, for a particular CSP, data centers in the US West region may be located in San Jose, California; data centers in the US East region may be located in Ashburn, Virginia; data centers in the Australia East region may be located in Sydney, Australia; data centers in the Australia Southeast region may be located in Melbourne, Australia; and the like.

Data centers within a region may be organized into one or more availability domains, which are used for high availability and disaster recovery purposes. An availability domain can include one or more data centers within a region. Availability domains within a region are isolated from each other, fault tolerant, and are architected in such a way that data centers in multiple availability domains are very unlikely to fail simultaneously. For example, the availability domains within a region may be structured in a manner such that a failure at one availability domain within the region is unlikely to impact the availability of data centers in other availability domains within the same region.

When a customer or subscriber subscribes to or signs up for one or more services provided by a CSP, the CSP creates a tenancy for the customer. The tenancy is like an account that is created for the customer. In certain implementations, a tenancy for a customer exists in a single realm and can access all regions that belong to that realm. The customer's users can then access the services subscribed to by the customer under this tenancy.

As indicated above, a CSP builds or deploys data centers to provide cloud services to its customers. As a CSP's customer base grows, the CSP typically builds new data centers in new regions or increases the capacity of existing data centers to service the customers' growing demands and to better serve the customers. Preferably, a data center is built in close geographical proximity to the location of customers serviced by that data center. Geographical proximity between a data center and customers serviced by that data center lends to more efficient use of resources and faster and more reliable services being provided to the customers. Accordingly, a CSP typically builds new data centers in new regions in geographical areas that are geographically proximal to the customers serviced by the data centers. For example, for a growing customer base in Germany, a CSP may build one or more data centers in a new region in Germany.

Building a data center (or multiple data centers) in a region is sometimes also referred to as building a region. The term "region build" is used to refer to building one or more data centers in a region. Building a data center in a region involves provisioning or creating a set of new resources that are needed or used for providing a set of services that the data center is configured to provide. The end result of the region build process is the creation of a data center in a region, where the data center is capable of providing a set of services intended for that data enter and includes a set of resources that are used to provide the set of services.

Building a new data center in a region is a very complex activity requiring coordination between various teams. At a high level, this involves the performance and coordination of various tasks such as: identifying the set of services to be provided by the data center, identifying various resources that are needed for providing the set of services, creating, provisioning, and deploying the identified resources, wiring the resources properly so that they can be used in an intended manner, and the like. Each of these tasks further have subtasks that need to be coordinated, further adding to the complexity. Due to this complexity, presently, the building of a data center in a region involves several manually-initiated or manually-controlled tasks that require careful manual coordination. As a result, the task of building a new region (i.e., building one or more data centers in a region) is very time consuming. It can take time, for example, many months to build a data center. Additionally, the process is very error prone, sometimes requiring several iterations before a desired configuration of the data center is achieved, which further adds to the time taken to build a data center. These limitations and problems severely limit a CSP's ability to grow in a timely manner responsive to increasing customer needs.

The present disclosure describes techniques for reducing the time and manual efforts needed for building one or more data centers in a region. This is made possible by automating several of the tasks that are involved in building a region. The automation significantly reduces the time needed to build a data center in a region and reduces the manual coordination that is needed. Instead of weeks and months needed to build a data center in a region in the past, the techniques described herein can be used to build a new data center in a region in a relatively much shorter time.

A Cloud Infrastructure Orchestration Service (CIOS) is disclosed herein that is configured to bootstrap (e.g., provision and deploy) services into a new data center based on predefined configuration files that identify the resources (e.g., infrastructure components and software to be deployed) for implementing a given change to the data center. The CIOS can identify dependencies between bootstrapping tasks using a static analysis of these configuration files. CIOS can use these dependencies to coordinate the order in which various changes are made to the new data center (e.g., the order by which services are bootstrapped in the region). The CIOS can detect various capabilities of the region as they become available which enables the system to identify and implement additional changes that can now be made to the region. Utilizing the techniques disclosed herein, the CIOS may optimize parallel processing to execute changes to the new data center while ensuring that tasks are not initiated until the functionality on which those tasks depend is available in the region. In this manner, the CIOS enables a region build to be performed as a substantially automated process, which greatly reduces the risk of error and time required in conventional systems.

Certain Definitions

A "region" is a logical abstraction corresponding to a geographical location. A region can include any suitable number of one or more execution targets. In some embodiments, an execution target could correspond to a data center.

An "execution target" refers to a smallest unit of change for executing a release. A "release" refers to a representation of an intent to orchestrate a specific change to a service (e.g., deploy version 8, "add an internal DNS record," etc.). For most services, an execution target represents is an "instance" of a service. A single service can be bootstrapped to each of one or more execution targets. An execution target may be associated with a set of devices (e.g., a data center).

"Bootstrapping" is intended to refer to the collective tasks associated with provisioning and deployment of any suitable number of resources (e.g., infrastructure components, artifacts, etc.) corresponding to a single service.

A "service" refers to functionality provided by a set of resources. A set of resources for a service includes any suitable combination of infrastructure, platform, or software (e.g., an application) hosted by a cloud provider that can be configured to provide the functionality of a service. A service can be made available to users through the Internet.

An "artifact" refers to code being deployed to an infrastructure component or a Kubernetes engine cluster, this may include software (e.g., an application), configuration information (e.g., a configuration file) for an infrastructure component, or the like.

A "flock config" refers to a configuration file (or a set of configuration files) that describes a set of all resources (e.g., infrastructure components and artifacts) associated with a single service. A flock config may include declarative statements that specify one or more aspects corresponding to a desired state of the resources of the service.

"Service state" refers to a point-in-time snapshot of every resource (e.g., infrastructure resources, artifacts, etc.) associated with the service. The service state indicates status corresponding to provisioning and/or deployment tasks associated with service resources.

IaaS provisioning (or "provisioning") refers to acquiring computers or virtual hosts for use, and even installing needed libraries or services on them. The phrase "provisioning a device" refers to evolving a device to a state in which it can be utilized by an end-user for their specific use. A device that has undergone the provisioning process may be referred to as a "provisioned device." Preparing the provisioned device (installing libraries and daemons) may be part of provisioning; this preparation is different from deploying new applications or new versions of an application onto the prepared device. In most cases, deployment does not include provisioning, and the provisioning may need to be performed first. Once prepared, the device may be referred to as "an infrastructure component."

IaaS deployment (or "deployment") refers to the process of providing and/or installing a new application, or a new version of an application, onto a provisioned infrastructure component. Once the infrastructure component has been provisioned (e.g., acquired, assigned, prepared, etc.), additional software may be deployed (e.g., provided to and installed on the infrastructure component). The infrastructure component can be referred to as a "resource" after provisioning and deployment has concluded. Examples of resources may include, but are not limited to, virtual machines, databases, object storage, block storage, load balancers, and the like.

A "capability" identifies a unit of functionality associated with a service. The unit could be a portion, or all, of the functionality to be provided by the service. By way of example, a capability can be published indicating that a resource is available for authorization/authentication processing (e.g., a subset of the functionality to be provided by the resource). As another example, a capability can be published indicating the full functionality of the service is available. Capabilities can be used to identify functionality on which a resource or service depends and/or functionality of a resource or service that is available for use.

A "virtual bootstrap environment" (ViBE) refers to a virtual cloud network that is provisioned in the overlay of an existing region (e.g., a "host region"). Once provisioned, a ViBE is connected to a new region using a communication channel (e.g., an IPSec Tunnel VPN). Certain essential core services (or "seed" services) like a deployment orchestrator, a public key infrastructure (PKI) service, and the like can be provisioned in a ViBE. These services can provide the capabilities required to bring the hardware online, establish a chain of trust to the new region, and deploy the remaining services in the new region. Utilizing the virtual bootstrap environment can prevent circular dependencies between bootstrapping resources by utilizing resources of the host region. Services can be staged and texted in the ViBE prior to the physical region (e.g., the target region) being available.

A "Cloud Infrastructure Orchestration Service" (CIOS) may refer to a system configured to manage provisioning and deployment operations for any suitable number of services as part of a region build.

A Multi-Flock Orchestrator (MFO) may be a computing component (e.g., a service) configured that coordinates events between components of the CIOS to automatically provision and deploy services to a target region (e.g., a new region). An MFO tracks relevant events for each service of the region build and takes actions in response to those events.

A "host region" refers to a region that hosts a virtual bootstrap environment (ViBE). A host region may be used to bootstrap a ViBE.

A "target region" refers to a region under build.

"Publishing a capability" refers to "publishing" as used in a "publisher-subscriber" computing design or otherwise providing an indication that a particular capability is available (or unavailable). The capabilities are "published" (e.g., collected by a capabilities service, provided to a capabilities service, pushed, pulled, etc.) to provide an indication that functionality of a resource/service is available. In some embodiments, capabilities may be published/transmitted via an event, a notification, a data transmission, a function call, an API call, or the like. An event (or other notification/data transmission/etc.) indicating availability of a particular capability can be broadcasted/addressed (e.g., published) to a capabilities service.

A "Capabilities Service" may be a flock configured to model dependencies between different flocks. A capabilities service may be provided within a Cloud Infrastructure Orchestration Service and may define what capabilities, services, features have been made available in a region.

A "Real-time Regional Data DistributorDistributor" (RRDD) can be a service or system configured to manage region data. This region data can be injected into flock configs to dynamically create execution targets for new regions.

In some examples, techniques for implementing a Cloud Infrastructure Orchestration Service (CIOS) are described herein. Such techniques, as described briefly above, can be configured to manage bootstrapping (e.g., provisioning and deploying software to) infrastructure components within a cloud environment (e.g., a region). In some instances, the CIOS can include computing components (e.g., a CIOS Central and a CIOS Regional, both of which will be described in further detail below) that may be configured to manage bootstrapping tasks (provisioning and deployment) for a given service and a Multi-Flock Orchestrator (also described in further detail below) configured to initiate/manage region builds (e.g., bootstrapping operations corresponding to multiple services).

CIOS enables region building and world-wide infrastructure provisioning and code deployment with minimal manual run-time effort from service teams (e.g., beyond an initial approval and/or physical transportation of hardware, in some instances). The high-level responsibilities of CIOS include, but are not limited to, coordinating region builds in an automated fashion with minimal human intervention, providing users with a view of the current state of resources managed by the CIOS (e.g., of a region, across regions, world-wide, etc.), and managing bootstrapping operations for bootstrapping resources within a region.

The CIOS may provide view reconciliation, where a view of a desired state (e.g., a desired configuration) of resources may be reconciled with a current/actual state (e.g., a current configuration) of the resources. In some instances, view reconciliation may include obtaining state data to identify what resources are actually running and their current configuration and/or state. Reconciliation can be performed at a variety of granularities, such as at a service level.

CIOS can perform plan generation, where differences between the desired and current state of the resources are identified. Part of plan generation can include identifying the operations that would need to be executed to bring the resources from the current state to the desired state. Once the user is satisfied with a plan, the plan can then be marked as approved or rejected. Thus, users can spend less time reasoning about the plan and the plans are more accurate because they are machine generated. Plans are almost too detailed for human consumption; however, CIOS can provide this data via a sophisticated user interface (UI).

In some examples, CIOS can handle execution of change management by automatically executing the approved plan. Once an execution plan has been created and approved, engineers may no longer need to participate in change management unless CIOS initiates roll-back. CIOS can handle rolling back to a previous service version by automatically generating a plan that returns the service to a previous (e.g., pre-release) state (e.g., when CIOS detects service health degradation while executing).

CIOS can measure service health by monitoring alarms and executing integration tests. CIOS can help teams quickly define roll-back behavior in the event of service degradation, which it can later execute automatically. CIOS can automatically generate and display plans and can track approval. CIOS can combine the functionality of provisioning and deployment in a single system that coordinates these tasks across a region build. CIOS also supports automated discovery of flocks (e.g., service resources such as flock config(s) corresponding to any suitable number of services), artifacts, resources, and dependencies. CIOS can discover dependencies between execution tasks at every level (e.g., resource level, execution target level, phase level, service level, etc.) through a static analysis (e.g., including parsing and processing content) of one or more configuration files. Using these dependencies, CIOS can generate various data structures from these dependencies that can be used to drive task execution (e.g., tasks regarding provisioning of infrastructure resources and deployment of artifacts across the region).

FIG. 1 is a block diagram of an environment 100 in which a Cloud Infrastructure Orchestration Service (CIOS) 102 may operate to dynamically provide bootstrap services in a region, according to at least one embodiment. CIOS 102 can include, but is not limited to, the following components: Real-time Regional Data Distributor (RRDD) 104, Multi-Flock Orchestrator (MFO) 106, CIOS Central 108, CIOS Regional 110, and Capabilities Service 112. Specific functionality of CIOS Central 108 and CIOS Regional 110 is provided in more detail in U.S. application Ser. No. 17/016,754, entitled "Techniques for Deploying Infrastructure Resources with a Declarative Provisioning Tool," the entire contents of which are incorporated in its entirety for all purposes. In some embodiments, any suitable combination of the components of CIOS 102 may be provided as a service. In some embodiments, some portion of CIOS 102 may be deployed to a region (e.g., a data center represented by host region 103). In some embodiments, CIOS 102 may include any suitable number of cloud services (not depicted in FIG. 1) discussed in further detail in U.S. application Ser. No. 17/016,754 and below with respect to FIGS. 2 and 3.

Real-time Regional Data Distributor (RRDD) 104 may be configured to maintain and provide region data that identifies realms, regions, execution targets, and availability domains. In some cases, the region data may be in any suitable form (e.g., JSON format, data objects/containers, XML, etc.). Region data maintained by RRDD 104 may include any suitable number of subsets of data which can individually be referenceable by a corresponding identifier. By way of example, an identifier "all regions" can be associated with a data structure (e.g., a list, a structure, an object, etc.) that includes a metadata for all defined regions. As another example, an identifier such as "realms" can be associated with a data structure that identifies metadata for a number of realms and a set of regions corresponding to each realm. In general, the region data may maintain any suitable attribute of one or more realm(s), region(s), availability domains (ADs), execution target(s) (ETs), and the like, such as identifiers, DNS suffixes, states (e.g., a state of a region), and the like. The RRDD 104 may be configured to manage region state as part of the region data. A region state may include any suitable information indicating a state of bootstrapping within a region. By way of example, some example region states can include "initial," "building," "production," "paused," or "deprecated." The "initial" state may indicate a region that has not yet been bootstrapped. A "building" state may indicate that bootstrapping of one or more flocks within the region has commenced. A "production" state may indicate that bootstrapping has been completed and the region is ready for validation. A "paused" state may indicate that CIOS Central 108 or CIOS Regional 110 has paused internal interactions with the regional stack, likely due to an operational issue. A "deprecated" state may indicate the region has been deprecated and is likely unavailable and/or will not be contacted again.

CIOS Central 108 is configured to provide any suitable number of user interfaces with which users (e.g., user 109) may interact with CIOS 102. By way of example, users can make changes to region data via a user interface provided by CIOS Central 108. CIOS Central 108 may additionally provide a variety of interfaces that enable users to: view changes made to flock configs and/or artifacts, generate and view plans, approve/reject plans, view status on plan execution (e.g., corresponding to tasks involving infrastructure provisioning, deployment, region build, and/or desired state of any suitable number of resources managed by CIOS 102. CIOS Central 108 may implement a control plane configured to manage any suitable number of CIOS Regional 110 instances. CIOS Central 108 can provide one or more user interfaces for presenting region data, enabling the user 109 to view and/or change region data. CIOS Central 108 can be configured to invoke the functionality of RRDD 104 via any suitable number of interfaces. Generally, CIOS Central 108 may be configured to manager region data, either directly or indirectly (e.g., via RRDD 104). CIOS Central 108 may be configured to compile flock configs to inject region data as variables within the flock configs. In some embodiments, CIOS Central 108 may provide the visualizations of FIGS. 7, 8 and/or 11 based at least in part on any suitable data provided by the multi-flock orchestrator.

Each instance of CIOS Regional 110 may correspond to a module configured to execute bootstrapping tasks that are associated with a single service of a region. CIOS Regional 110 can receive desired state data from CIOS Central 108. In some embodiments, desired state data may include a flock config that declares (e.g., via declarative statements) a desired state of resources associated with a service. CIOS Central 108 can maintain current state data indicating any suitable aspect of the current state of the resources associated with a service. In some embodiments, CIOS Regional 110 can identify, through a comparison of the desired state data and the current state data, that changes are needed to one or more resources. For example, CIOS Regional 110 can determine that one or more infrastructure components need to be provisioned, one or more artifacts deployed, or any suitable change needed to the resources of the service to bring the state of those resources in line with the desired state. As CIOS Regional 110 performs bootstrapping operations, it may publish data indicating various capabilities of a resource as they become available. A "capability" identifies a unit of functionality associated with a service. The unit could be a portion, or all of the functionality to be provided by the service. By way of example, a capability can be published indicating that a resource is available for authorization/authentication processing (e.g., a subset of the functionality to be provided by the resource). As another example, a capability can be published indicating the full functionality of the service is available. Capabilities can be used to identify functionality on which a resource or service depends and/or functionality of a resource or service that is available for use.

Capabilities Service 112 is configured to maintain capabilities data that indicates 1) what capabilities of various services are currently available, 2) whether any resource/service is waiting on a particular capability, 3) what particular resources and/or services are waiting on a given capability, or any suitable combination of the above. Capabilities Service 112 may provide an interface with which capabilities data may be requested. Capabilities Service 112 may provide one or more interfaces (e.g., application programming interfaces) that enable it to transmit capabilities data to MFO 106 and/or CIOS Regional 110 (e.g., each instance of CIOS Regional 110). In some embodiments, MFO 106 and/or any suitable component or module of CIOS Regional 110 may be configured to request capabilities data from Capabilities Service 112.

In some embodiments, Multi-Flock Orchestrator (MFO) 106 may be configured to drive region build efforts. In some embodiments, MFO 106 can manage information that describes what flock/flock config versions and/or artifact versions are to be utilized to bootstrap a given service within a region (or to make a unit of change to a target region). In some embodiments, MFO 106 may be configured to monitor (or be otherwise notified of) changes to the region data managed by Real-time Regional Data Distributor 104. In some embodiments, receiving an indication that region data has been changed may cause a region build to be triggered by MFO 106. In some embodiments, MFO 106 may collect various flock configs and artifacts to be used for a region build. Some, or all, of the flock configs may be configured to be region agnostic. That is, the flock configs may not explicitly identify what regions to which the flock is to be bootstrapped. In some embodiments, MFO 106 may trigger a data injection process through which the collected flock configs are recompiled (e.g., by CIOS Central 108). During recompilation, operations may be executed (e.g., by CIOS Central 108) to cause the region data maintained by Real-time Regional Data Distributor 104 to be injected into the config files. Flock configs can reference region data through variables/parameters without requiring hard-coded identification of region data. The flock configs can be dynamically modified at run time using this data injection rather than having the region data be hardcoded, and therefore, and more difficult to change.

Multi-Flock Orchestrator 106 can perform a static flock analysis in which the flock configs are parsed to identify dependencies between resources, execution targets, phases, and flocks, and in particular to identify circular dependencies that need to be removed. In some embodiments, MFO 106 can generate any suitable number of data structures based on the dependencies identified. These data structures (e.g., directed acyclic graph(s), linked lists, etc.) may be utilized by the Cloud Infrastructure Orchestration Service 102 to drive operations for performing a region build. By way of example, these data structures may collectively define an order by which services are bootstrapped within a region. An example of such a data structure is discussed further below with respect to build dependency graph 314 of FIG. 3. If circular dependencies (e.g., service A requires service B and vice versa) exist and are identified through the static flock analysis and/or graph, MFO may be configured to notify any suitable service teams that changes are required to the corresponding flock config to correct these circular dependencies. MFO 106 can be configured to traverse one or more data structures to manage an order by which services are bootstrapped to a region. MFO 106 can identify (e.g., using data obtained from Capabilities Service 112) capabilities available within a given region at any given time. MFO 106 can this data to identify when it can bootstrap a service, when bootstrapping is blocked, and/or when bootstrapping operations associated with a previously blocked service can resume. Based on this traversal, MFO 106 can perform a variety of releases in which instructions are transmitted by MFO 106 to CIOS Central 108 to perform bootstrapping operations corresponding to any suitable number of flock configs. In some examples, MFO 106 may be configured to identify that one or more flock configs may require multiple releases due to circular dependencies found within the graph. As a result, MFO 106 may transmit multiple instruction sets to CIOS Central 108 for a given flock config to break the circular dependencies identified in the graph.

In some embodiments, a user can request that a new region (e.g., target region 114) be built. This can involve bootstrapping resources corresponding to a variety of services. In some embodiments, target region 114 may not be communicatively available (and/or secure) at a time at which the region build request is initiated. Rather than delay bootstrapping until such time as target region 114 is available and configured to perform bootstrapping operations, CIOS 102 may initiate the region build using a virtual bootstrap environment 116. Virtual bootstrap environment (ViBE) 116 may be an overlay network that is hosted by host region 103 (a preexisting region that has previously been configured with a core set of services and which is communicatively available and secure). MFO 106 can leverage resources of the host region 103 to bootstrap resources to the ViBE 116 (generally referred to as "building the ViBE"). By way of example, MFO 106 can provide instructions through CIOS Central 108 that cause an instance of CIOS Regional 110 within a host region (e.g., region 103) to bootstrap another instance of CIOS Regional within the ViBE 116. Once the CIOS Regional within the ViBE is available for processing, bootstrapping the services for the target region 114 can continue within the ViBE 116. When target region 114 is available to perform bootstrapping operations, the previously bootstrapped services within ViBE 116 may be migrated to target region 114. Utilizing these techniques, CIOS 102 can greatly improve the speed at which a region is built by drastically reducing the need for any manual input and/or configuration to be provided.

Figure 2:
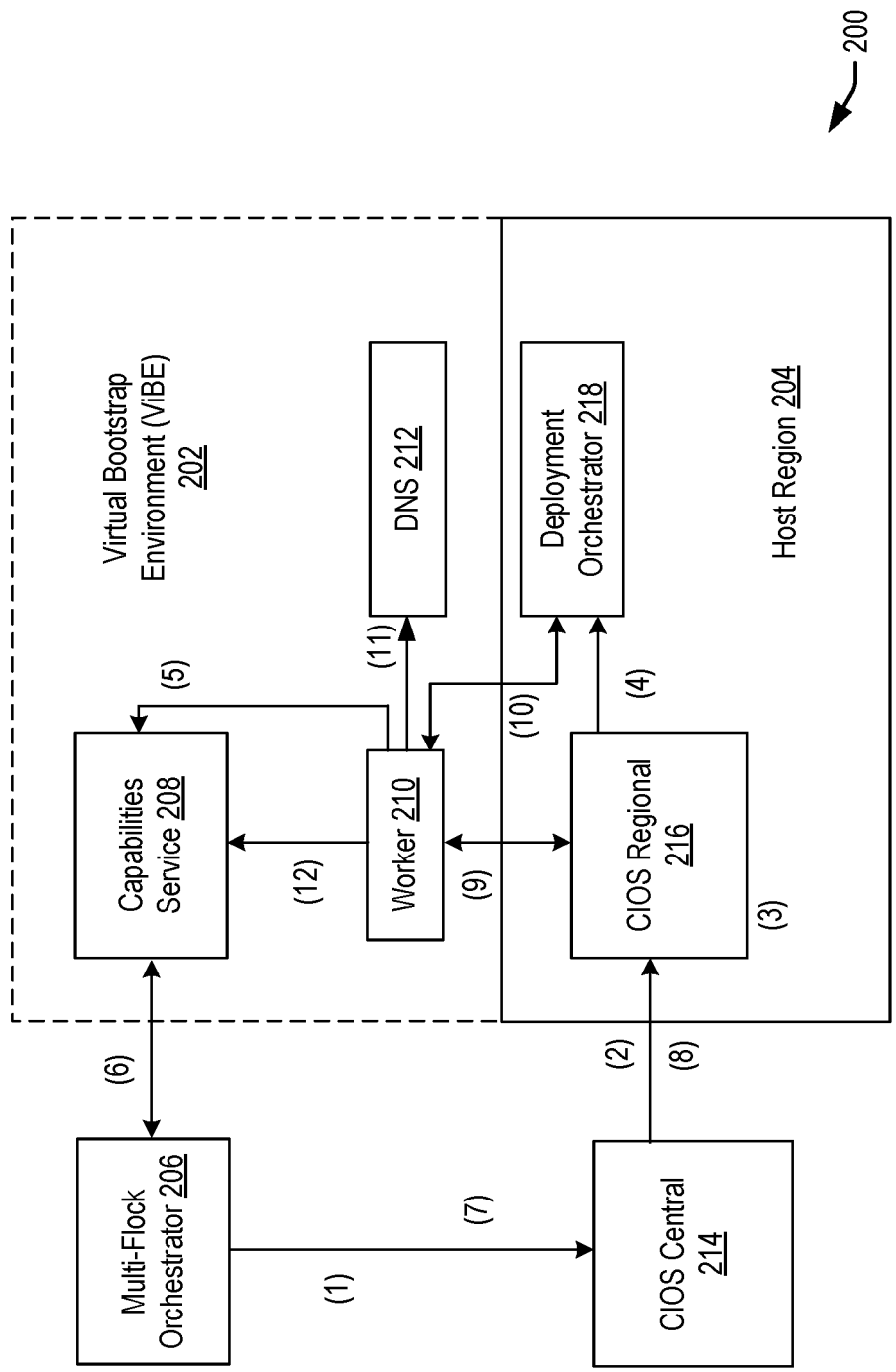
FIG. 2 is a block diagram for illustrating an environment and method for building a virtual bootstrap environment (ViBE), according to at least one embodiment.

FIG. 2 is a block diagram for illustrating an environment 200 and method for building a virtual bootstrap environment (ViBE) (ViBE 202, an example of ViBE 116 of FIG. 1), according to at least one embodiment. ViBE 202 represents a virtual cloud network that is provisioned in the overlay of an existing region (e.g., host region 204, an example of the host region 103 of FIG. 1 and in an embodiment is a Host Region Service Enclave). ViBE 202 represents an environment in which services can be staged for a target region (e.g., a region under build such as target region 116 of FIG. 1) before the target region becomes available.

In order to bootstrap a new region (e.g., target region 116 of FIG. 1), a cores set of services may be bootstrapped. While those core set of services exist in the host region 204, they do not yet exist in the ViBE (nor the target region). These essential core services provide the functionality needed to provision devices, establish a chain of trust to the new region, and deploy remaining services (e.g., flocks) into a region. The ViBE 202 may be a tenancy that is deployed in a host region 204. It can be thought of as a virtual region.

When the target region is available to provide bootstrapping operations, the ViBE 202 can be connected to the target region so that services in the ViBE can interact with the services and/or infrastructure components of the target region. This will enable deployment of production level services, instead of self-contained seed services as in previous systems, and will require connectivity over the internet to the target region. Conventionally, a seed service was deployed as part of a container collection and used to bootstrap dependencies necessary to build out the region. Using infrastructure/tooling of an existing region, resources may be bootstrapped (e.g., provisioned and deployed) into the ViBE 202 and connected to the service enclave of a region (e.g., host region 204) in order to provision hardware and deploy services until the target region is self-sufficient and can be communicated with directly. Utilizing the ViBE 202 allows for standing up the dependencies and services needed to be able to provision/prepare infrastructure and deploy software while making use of the host region's resources in order to break circular dependencies of core services.

Multi-Flock Orchestrator (MFO) 206 may be configured to perform operations to build (e.g., configure) ViBE 202. MFO 206 can obtain applicable flock configs corresponding to various resources to be bootstrapped to the new region. By way of example, MFO 206 may obtain a flock config (e.g., a "ViBE flock config") that identifies aspects of bootstrapping Capabilities Service 208 and Worker 210, which in one example, is a CIOS primordial worker. As another example, MFO 206 may obtain another flock config corresponding to bootstrapping Domain Name Service (DNS) 212 to ViBE 202.

At step 1, MFO 206 may instruct CIOS Central 214 (e.g., an example of CIOS Central 108 and CIOS Central 202 of FIGS. 1 and 2, respectively). For example, MFO 206 may transmit a request including the ViBE flock config to request bootstrapping of the Capabilities Service 208 and Worker 210 that, at this time do not yet exist in the ViBE 202. In some embodiments, CIOS Central 214 may have access to all flock configs. Therefore, in some examples, MFO 206 may transmit an identifier for the ViBE flock config rather than the file itself, and CIOS Central 214 may independently obtain it from storage (e.g., from SCVMS 204 of FIG. 2).

At step 2, CIOS Central 214 may provide the ViBE flock config via a corresponding request to CIOS Regional 216. CIOS Regional 216 may parse the ViBE flock config to identify and execute specific infrastructure provisioning and deployment operations at step 3.

In some embodiments, the CIOS Regional 216 may utilize additional corresponding services for provisioning and deployment. For example, at step 4, CIOS Regional 216 CIOS Regionalmay instruct deployment orchestrator 218 (e.g., an example of a core service, e.g., odo or other write, build, and deploy applications software, of the host region 204) to execute instructions that in turn cause Capabilities Service 208 and Worker 210 to be bootratpped within ViBE 202.

At step 5, a capability may be transmitted to the Capabilities Service 208 (from the CIOS Regional 216, Deployment Orchestrator 218 via the Worker 210 or otherwise) indicating that resources corresponding to the ViBE flock are available. Capabilities Service 208 may persist this data. In some embodiments, the Capabilities Service 208 adds this information to a list it maintains of available capabilities with the ViBE. By way of example, the capability provided to Capabilities Service 208 at step 5 may indicate the Capabilities Service 208 and Worker 210 are available for processing.

At step 6, MFO 206 may identify that the capability indicating that Capabilities Service 208 and Worker 210 are available based on receiving or obtaining data (an identifier corresponding to the capability) from the Capabilities Service 208.

At step 7, as a result of receiving/obtaining the data at step 6, the MFO 206 may instruct CIOS Central 214 to bootstrap a DNS service (e.g., DNS 212) to the ViBE 202. The instructions may identify or include a particular flock config corresponding to the DNS service.

At step 8, the CIOS Central 214 may instruct the CIOS Regional 216 to deploy DNS 212 to the ViBE 202. In some embodiments, the DNS flock config for the DNS 212 is provided by the CIOS Central 214.

At step 9, Worker 210, now that it is deployed in the ViBE 202, may be assigned by CIOS Regional 216 to the task of deploying DNS 212. Worker may execute a declarative infrastructure provisioner in the manner described above in connection with FIG. 3 to identify (e.g., from comparing the flock config (the desired state) to a current state of the (currently non-existing) resources associated with the flock) a set of operations that need to be executed to deploy DNS 212.

At step 10, the Deployment Orchestrator 218 may instruct Worker 210 to deploy DNS 212 in accordance with the operations identified at step 9. As depicted, Worker 210 proceeds with executing operations to deploy DNS 212 to ViBE 202 at step 11. At step 12, Worker 210 notifies Capabilities Service 208 that DNS 212 is available in ViBE 202. MFO 206 may subsequently identify that the resources associated with the ViBE flock config and the DNS flock config are available any may proceed to bootstrap any suitable number of additional resources to the ViBE.

After steps 1-12 are concluded, the process for building the ViBE 202 can be considered complete and the ViBE 202 can be considered built.

Figure 3:
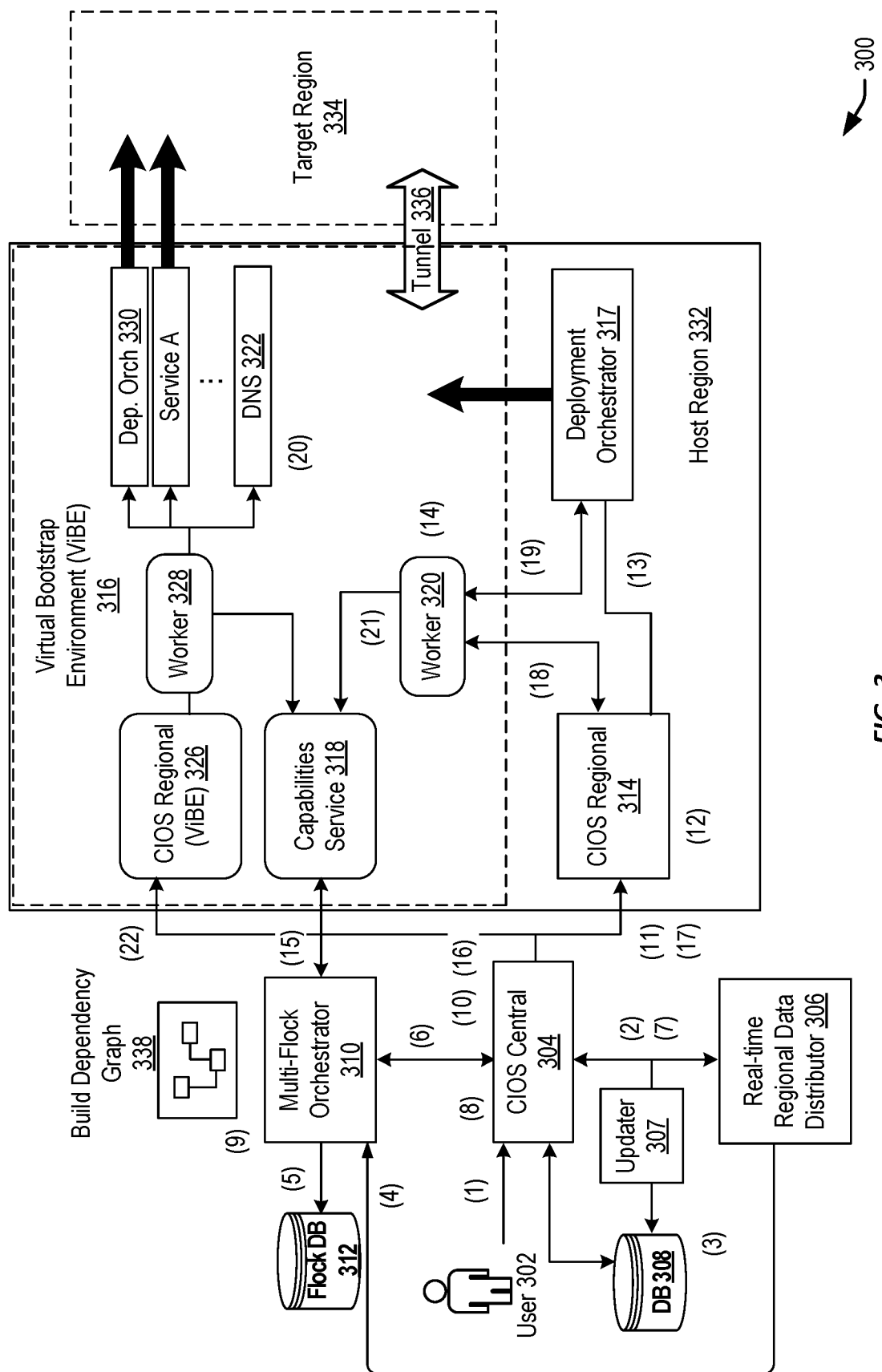
FIG. 3 is a block diagram for illustrating an environment and method for bootstrapping services to a target region utilizing the ViBE, according to at least one embodiment.

FIG. 3 is a block diagram for illustrating an environment 300 and method for bootstrapping services to a target region utilizing the ViBE, according to at least one embodiment.

At step 1, user 302 may utilize any suitable user interface provided by CIOS Central (CIOS Central) 304 (an example of CIOS Central 108 and CIOS Central 202 of FIGS. 1 and 2, respectively) to modify region data. By way of example, user 302 may create a new region to which a number of services are to be bootstrapped.

At step 2, CIOS Central 304 may execute operations to send the change to RRDD 306 (e.g., an example of RRDD 104 of FIG. 1). At step 3, RRDD 306 may store the received region data in database 308, a data store configured to store region data including any suitable identifier, attribute, state, etc. of a region, AD, realm, ET, or the like. In some embodiments, updater 307 may be utilized to store region data in database 308 or any suitable data store from which such updates may be accessible (e.g., to service teams). In some embodiments, updater 307 may be configured to notify (e.g., via any suitable electronic notification) of updates made to database 308.

At step 4, MFO 310 (an example of the MFO 106 and 206 of FIGS. 1 and 2, respectively) may detect the change in region data. In some embodiments, MFO 310 may be configured to poll RRDD 306 for changes in region data. In some embodiments, RRDD 306 may be configured to publish or otherwise notify MFO 310 of region changes.

At step 5, detecting the change in region data may trigger MFO 310 to obtain a version set (e.g., a version set associated with a particular identifier such as a "golden version set" identifier). identifying a particular version for each flock (e.g., service) that is to be bootstrapped to the new region and a particular version for each artifact corresponding to that flock. The version set may be obtained from DB 312. As flocks evolve and change, the versions for their corresponding configs and artifacts used for region build may change. These changes may be persisted in flock DB 312 such that MFO 310 may identify which versions of flock configs and artifacts to use for region build. The flock configs (e.g., all versions of the flock configs) and/or artifacts (e.g., all versions of the artifacts) may be stored in DB 308, DB 312, or any suitable data store accessible to the CIOS Central 304 and/or MFO 310.

At step 6, MFO 310 may request CIOS Central 304 to recompile of each of the flock configs associated with the version set with the current region data. In some embodiments, the request may indicate a version for each flock config and/or artifact corresponding to those flock configs.

At step 7, CIOS Central 304 may obtain current region data from the DB 308 (e.g., directly, or via Real-time Regional Data Distributor 306) and retrieve any suitable flock config and artifact in accordance with the versions requested by MFO 310.

At step 8, CIOS Central 304 may recompile the flock configs with the region data obtained at step 7 to inject the flock configs with current region data. CIOS Central 304 may return the compiled flock configs to MFO 310. In some embodiments, CIOS Central 304 may simply indicate compilation is done, and MFO 310 may access the recompiled flock configs via RRDD 306.

At step 9, MFO 310 may perform a static analysis of the recompiled flock configs. As part of the static analysis, MFO 310 may parse the flock configs (e.g., using a library associated with the declarative infrastructure provisioner of CIOS Regional 314) to identify dependencies between flocks. From the analysis and the dependencies identified, MFO 310 can generate build dependency graph 314. Build dependency graph 314 may be an acyclic directed graph that identifies an order by which flocks are to be bootstrapped to the new region. Each node in the graph may correspond to bootstrapping a particular flock. The specific bootstrapping order may be identified based on the dependencies. In some embodiments, the dependencies may be expressed as an attribute of the node and/or indicated via edges of the graph that connect the nodes. MFO 310 may traverse the graph (e.g., beginning at a starting node) to drive the operations of the region build.

In some embodiments, MFO 310 may utilize a cycle detection algorithm to detect the presence of a cycle (e.g., service A depends on service B and vice versa). MFO 310 can identify orphaned capabilities dependencies. For example, MFO 310 can identify orphaned nodes of the build dependency graph 314 that do not connect to any other nodes. MFO 310 may identify falsely published capabilities (e.g., when a capability was prematurely published and the corresponding functionality is not actually yet available). MFO 310 can detect from the graph that one or more instances of publishing the same capability exist. In some embodiments, any suitable number of these errors may be detected and MFO 310 (or another suitable component such as CIOS Central 304) may be configured to notify or otherwise present this information to users (e.g., via an electronic notification, a user interface, or the like). In some embodiments, MFO 310 may be configured to force delete/recreate resources to break circular dependencies and may once again provide instructions to CIOS Central 304 to perform bootstrapping operations for those resources and/or corresponding flock configs.

A starting node may correspond to bootstrapping the ViBE flock, a second node may correspond to bootstrapping DNS. The steps 10-15 correspond to deploying (via deployment orchestrator 317, an example of the deployment orchestrator 218 of FIG. 2) a ViBE flock to ViBE 316 (e.g., an example of ViBE 116 and 202 of FIGS. 1, and 2, respectively). That is, steps 10-15 of FIG. 3 generally correspond to steps 1-6 of FIG. 2. Once notified that capabilities exist corresponding to the ViBE flock being deployed (e.g., indicating that Capabilities Service 318 and Worker 320, corresponding to Capabilities Service 208 and Worker 210 of FIG. 2, are available) the MFO 310 recommence traversal of the build dependency graph 314 to identify next operations to be executed.

By way of example, MFO 310 may continue traversing the build dependency graph 314 to identify that a DNS flock is to be deployed. Steps 16-21 may be executed to deploy DNS 322 (an example of the DNS 212 of FIG. 2). These operations may generally correspond to steps 7-12 of FIG. 2.

At step 21, a capability may be stored indicating that DNS 322 is available. Upon detecting this capability, MFO 310 may recommence traversal of the build dependency graph 314. On this traversal, the MFO 310 may identify that any suitable portion of an instance of CIOS Regional (e.g., an example of CIOS Regional 314) is to be deployed to the ViBE 316. In some embodiments, steps 16-21 may be substantially repeated with respect to deploying CIOS Regional (ViBE) 326 (an instance of CIOS Regional 314, CIOS Regional 110 of FIG. 1) and Worker 328 to the ViBE 316. A capability may be transmitted to the Capabilities Service 318 that CIOS Regional (ViBE) 326 is available.

Upon detecting the CIOS Regional 324 is available, MFO 310 may recommence traversal of the build dependency graph 314. On this traversal, the MFO 310 may identify that a deployment orchestrator (e.g., Deployment Orchestrator 330, an example of the Deployment Orchestrator 317) is to be deployed to the ViBE 316. In some embodiments, steps 16-21 may be substantially repeated with respect to deploying Deployment Orchestrator 330. Information that identifies a capability may be transmitted to the Capabilities Service 318, indicating that Deployment Orchestrator 330 is available.

After Deployment Orchestrator 330 is deployed, ViBE 316 may be considered available for processing subsequent requests. Upon detecting Deployment Orchestrator 330 is available, MFO 310 may instruct subsequent bootstrapping requests to be routed to ViBE components rather than utilizing host region components (components of host region 332). Thus, MFO 310 can continue traversing the Build dependency graph 314, at each node instructing flock deployment to the ViBE 316 via CIOS Central 304. CIOS Central 304 may request CIOS Regional (ViBE) 324 to deploy resources according to the flock config.

At some point during this process, Target Region 334 may become available. The availability of Target Region 334 may depend on establishing a network connection between the Target Region 334 and external networks (e.g., the Internet). The network connection may be supported over a public network (e.g., the Internet), but use software security tools (e.g., IPSec) to provide one or more encrypted tunnels (e.g., IPSec tunnels such as tunnel 336) from the ViBE 316 to Target Region 334. As used herein, "IPSec" refers to a protocol suite for authenticating and encrypting network traffic over a network that uses Internet Protocol (IP), and can include one or more available implementations of the protocol suite (e.g., Openswan, Libreswan, strongSwan, etc.). The network may connect the ViBE 316 to the service enclave of the Target Region 334.

Prior to establishing the IPSec tunnels, the initial network connection to the Target Region 334 may be on a connection (e.g., an out-of-band VPN tunnel) sufficient to allow bootstrapping of networking services until an IPSec gateway may be deployed on an asset (e.g., bare-metal asset) in the Target Region 334. To bootstrap the Target Region's 334 network resources, Deployment Orchestrator 330 can deploy the IPSec gateway at the asset within Target Region 334. The Deployment Orchestrator 330 may then deploy VPN hosts at the Target Region 334 configured to terminate IPSec tunnels from the ViBE 316. Once services (e.g., Deployment Orchestrator 330, Service A, etc.) in the ViBE 316 can establish an IPSec connection with the VPN hosts in the Target Region 334, bootstrapping operations from the ViBE 316 to the Target Region 334 may begin.

In some embodiments, the bootstrapping operations may begin with services in the ViBE 316 provisioning resources in the Target Region 334 to support hosting instances of core services as they are deployed from the ViBE 316. For example, a host provisioning service may provision hypervisors on infrastructure (e.g., bare-metal hosts) in the Target Region 334 to allocate computing resources for VMs. When the host provisioning service completes allocation of physical resources in the Target Region 334, the host provisioning service may publish information indicating a capability that indicates that the physical resources in the Target Region 334 have been allocated. The capability may be published to Capabilities Service 318 via CIOS Regional (ViBE) 324 (e.g., by Worker 328, which in one example can be a CIOS Regional worker).

With the hardware allocation of the Target Region 334 established and posted to capabilities manager 318, CIOS Regional (ViBE) 324 can orchestrate the deployment of instances of core services from the ViBE 316 to the Target Region 334. This deployment may be similar to the processes described above for building the ViBE 316, but using components of the ViBE (e.g., CIOS Regional (ViBE) 324, Worker 328, Deployment Orchestrator 330) instead of components of the Host Region 332 service enclave. The deployment operations may generally correspond to steps 16-21 described above.

As a service is deployed from the ViBE 316 to the Target Region 334, the DNS record associated with that service may correspond to the instance of the service in the ViBE 316. The DNS record associated with the service may be updated at a later time to complete deployment of the service to the Target Region 334. Said another way, the instance of the service in the ViBE 316 may continue to receive traffic (e.g., requests) to the service until the DNS record is updated. A service may deploy partially into the Target Region 334 and publish information indicating a capability (e.g., to Capabilities Service 318) that the service is partially deployed. For example, a service running in the ViBE 316 may be deployed into the Target Region 334 with a corresponding compute instance, load balancer, and associated applications and other software, but may need to wait for database data to migrate to the Target Region 334 before being completely deployed. The DNS record (e.g., managed by DNS 322) may still be associated with the service in the ViBE 316. Once data migration for the service is complete, the DNS record may be updated to point to the operational service deployed in the Target Region 334. The deployed service in the Target Region 334 may then receive traffic (e.g., requests) for the service, while the instance of the service in the ViBE 316 may no longer receive traffic for the service.

A. System Overview

A cloud infrastructure orchestration service (CIOS) can implement a plurality of functions/applications using computing resources disposed across one or more regions (e.g., datacenters). Further, as more computing resources are added to the CIOS, additional functions/applications can be added to the CIOS. The functions/applications implemented at the CIOS as described herein can be referred to as "capabilities." To implement (or "publish") a capability at the CIOS, resources (e.g., computer resources, software implementation resources) can be allocated to implement the capability.

Further, a capability in the CIOS can be dependent on one or more other capabilities. Additionally, a first capability can be a dependent for a second capability, such that implementation of the second capability is only possible after publishing the first capability. For example, a load balancer capability can be dependent on an object storage capability and a cloud identity service capability. Accordingly, in this example, to implement the load balancer capability, both the object storage capability and the cloud identity service capability need to be published (indicating that the object storage capability and the identity service capability are available).

In many CIOS infrastructure instances, a large number of capabilities can be published. Further, each capability can include differing dependencies, and each capability can unblock the publishing of any number of other capabilities. Tracing dependencies for multiple capabilities can be time and resource intensive. Further, publishing capabilities requires a variety of resources (e.g., computing resources, operator interaction, software development). Accordingly, there is a need to efficiently allocate resources to publish capabilities to efficiently implement services or build a new region, for example.

The present embodiments relate to processing capability data for a CIOS and generating visualization(s) providing insights to the capabilities of the CIOS. For instance, a multi-flock orchestrator (e.g., the multi-flock orchestrator 106) can process the capability data to determine, for each capability, a number of capabilities that are required to be published for a capability to publish (or "dependent capabilities") and a number of capabilities upon which each capability depends. The dependencies for each capability can be aggregated to derive a rank for each capability. The rank can specify a number of other capabilities that are capable of being unblocked responsive to the publishing of each capability. A first portion of a visualization can identify capabilities with all dependent capabilities published arranged by the rank for the identified capabilities.

The present embodiments can further derive a rank for all capabilities with one or more dependent capabilities that are unpublished. A second portion of the visualization can provide capabilities with one or more unpublished dependent capabilities arranged by rank. The second portion can also specify a number of steps (e.g., a number of dependent capabilities needing to be published) to publish each capability. Such a visualization can parse a large number of capabilities the CIOS and arrange capabilities based on the dependencies relating to each capability. The visualization can be used to allocate resources to efficiently publish capabilities and build new regions in the CIOS.

Further, the present embodiments can derive a critical path providing an efficient listing of resources to publish in order to allow for publication of a selected capability or flock of capabilities. For example, a flock with a number of capabilities can be selected. Further, each capability can include a number of dependent capabilities, each with a corresponding publication status (e.g., published, ready to be published, requiring the publishing of other capabilities). The multi-flock orchestrator as described herein can derive a plurality of paths for publishing capabilities across the CIOS to allow for the publishing (or "unblocking") all capabilities for the selected flock. Further, the multi-flock orchestrator can identify a path from the plurality of paths with a greatest efficiency in unblocking the capabilities for the selected flock. The critical path can be provided to a client for use in efficient allocation of resources in publishing capabilities in the CIOS.

A CIOS can include a plurality of regions. Each region can provide a grouping of computing resources within a geographic proximity or within a datacenter, for example. The computing resources part of the CIOS can implement a plurality of capabilities. Resources can be assigned to a flock that provides a grouping of resources in the CIOS.

Figure 4:
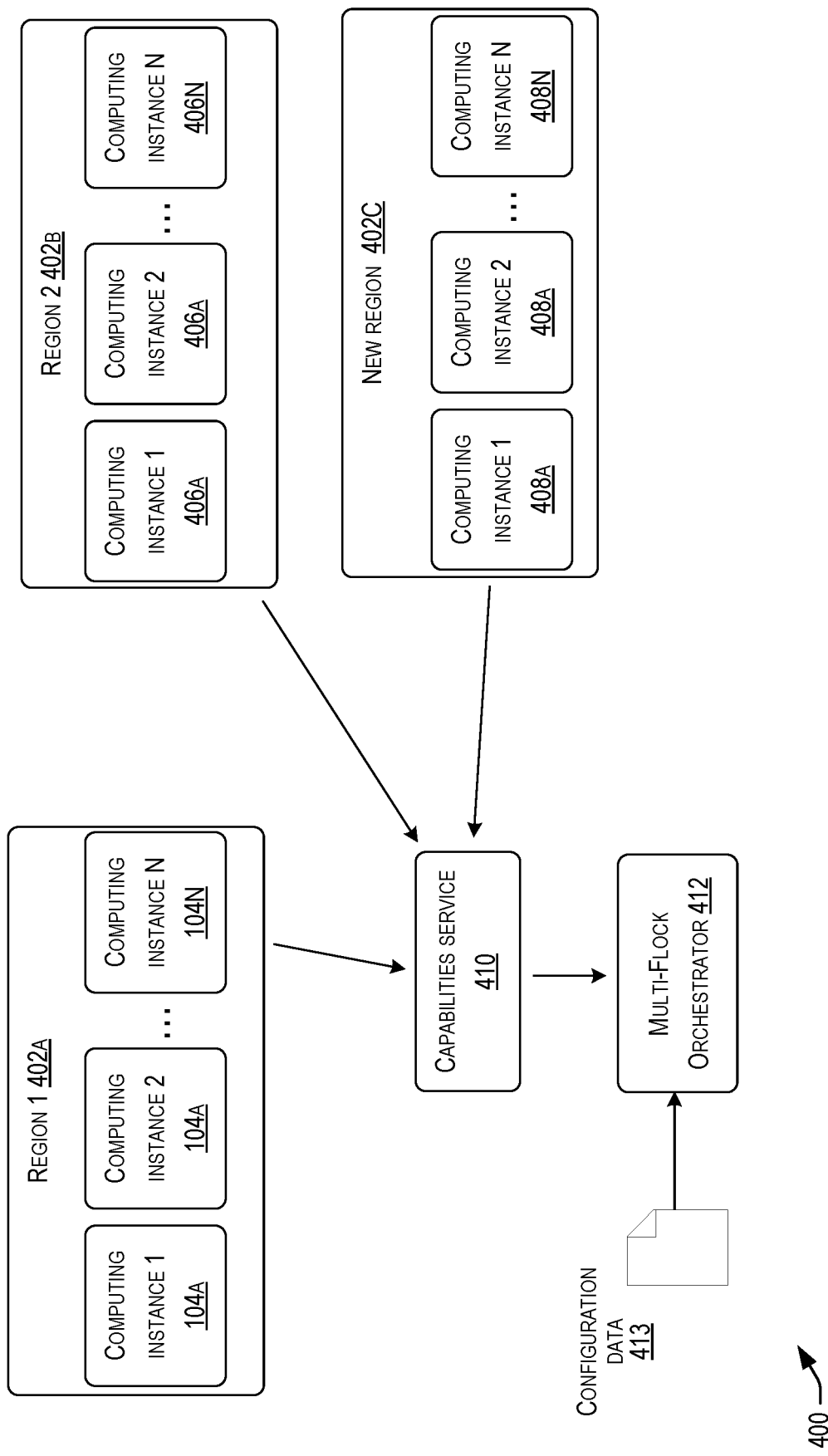
FIG. 4 provides a block diagram illustrating another example CIOS, according to at least one embodiment.

FIG. 4 provides a block diagram illustrating another example CIOS (e.g., CIOS 400, an example of CIOS 100 of FIG. 1). As shown in FIG. 4, a CIOS 400 can include multiple regions 402A, 402B. Each region 402A-B can comprise a plurality of computing instances 404A-N, 406A-N. Further, a new region 402C can be added to the CIOS 400 to add additional computing resources (e.g., computing instances 408A-N) to the CIOS 400.

The multi-flock orchestrator 412 can process configuration data (e.g., one or more flock configuration files) to identify dependencies between capabilities. By way of example, the multi-flock orchestrator 412 can perform any suitable number of parses of the flock configuration files described above (e.g., configuration data 413) to identify dependencies between capabilities/bootstrapping tasks. From these identified capabilities, the multi-flock orchestrator 412 can generate a ranking to prioritize publishing of capabilities (and/or executing corresponding bootstrapping tasks) in the CIOS 400. In some embodiments, the multi-flock orchestrator 412 can generate, from any suitable number of flock configuration files, a build dependency graph (e.g., build dependency graph 338) to drive the order of bootstrapping task execution within a region, across regions, or the like. The multi-flock orchestrator 412 may traverse the build dependency graph to identify bootstrapping tasks to be executed and an order by which those tasks are to be executed. When reaching a node in the graph (e.g., a node corresponding to a flock/set of resources to be bootstrapped), the multi-flock orchestrator 412 may identify bootstrapping tasks to be executed and capabilities on which execution of the node's corresponding bootstrapping tasks depend. If the current node's tasks depend on one or more other capabilities being published, the multi-flock orchestrator 412 may execute operations for identifying whether those other capabilities have been published. The build dependency graph may start with one or more nodes that have no dependencies on other capabilities. As the changes are made within the regions corresponding to those nodes, the multi-flock orchestrator can proceed in its traversal of the build dependency graph until it reaches a node that depends on capabilities that have not yet been published.

As resources are bootstrapped (e.g., infrastructure components provisioned, software artifacts deployed, etc.) to the CIOS, new capabilities can be added to the CIOS. As resources are added and/or units of change are executed, various capabilities can be published (e.g., by the capabilities service 410 based on input data received from CIOS Regional 314, described above) to indicate currently available functionality within the region. As a non-limiting example, a flock configuration file that specifies a unit of change (e.g., a set of resources to be bootstrapped to a region) may be associated with one or more capabilities. During execution of those changes (or upon completion of those changes), one or more capabilities may be published. A given capability (and its corresponding flock configuration file) can be associated with any suitable number of capabilities on which its publishing depends. Similarly, the publishing of any suitable number of other capabilities may depend on publishing of the given capability. For a capability to be published, all the capabilities on which it depends may need to be published. Therefore, in some embodiments, a unit of change corresponding to a flock configuration file may not be executed until all the capabilities on which it depends are available (as indicated by those capabilities being published).

Input data from the regions 402A-C can be provided to a capabilities service 410 (e.g., an example of the capabilities service 112 of FIG. 1, 208 of FIG. 2, and/or 318 of FIG. 3, respectively). The input data may indicate capabilities that are now available in the region as determined by another CIOS component (e.g., CIOS Regional 314 of FIG. 3). The capabilities service 410 can obtain input data across the regions 402A-C and process the input data to derive capability data. This capability data may indicate one or more capabilities that are now available with the regions 402A-C. In some embodiments, the capabilities service 410 may receive the input data from any suitable component (e.g., CIOS Regional 110 of FIG. 1) as bootstrapping tasks are completed for each flock (e.g., a set of resources to be bootstrapped according to a given flock configuration file), or at any suitable time. The capabilities service 410 may provide, publish, and/or broadcast the corresponding capability data to any suitable component of CIOS according to a predefined schedule, via broadcasting the capability data, and/or in response to a request received from another component of CIOS.

By way of example, the capability data can be provided from the capabilities service 410 to the multi-flock orchestrator 412. In some embodiments, the multi-flock orchestrator 412 can request this information from the capabilities service 410 at any suitable time. Using the capability data provided by the capabilities service 410, the multi-flock orchestrator 412 can identify when capabilities have been published that correspond to a node for which bootstrapping tasks were previously restricted due to waiting on the publishing of those capabilities. Identifying that those capabilities are now available, the multi-flock orchestrator 412 can allow and/or initiate the execution of that node's bootstrapping tasks (e.g., by instructing CIOS Central 304 accordingly). The multi-flock orchestrator 412 may then proceed with traversing the build dependency graph until it hits another node that depends on one or more capabilities that have not yet been published. The capabilities service 410 may manage a list of capabilities that are published, each indicating a respective unit of functionality and/or resources that are available within the region. The multi-flock orchestrator 412 may utilize the capabilities data received/obtained from the capabilities service 410 to drive its traversal of the build dependency graph, and consequently, the execution of bootstrapping tasks within the region.

Figure 5:
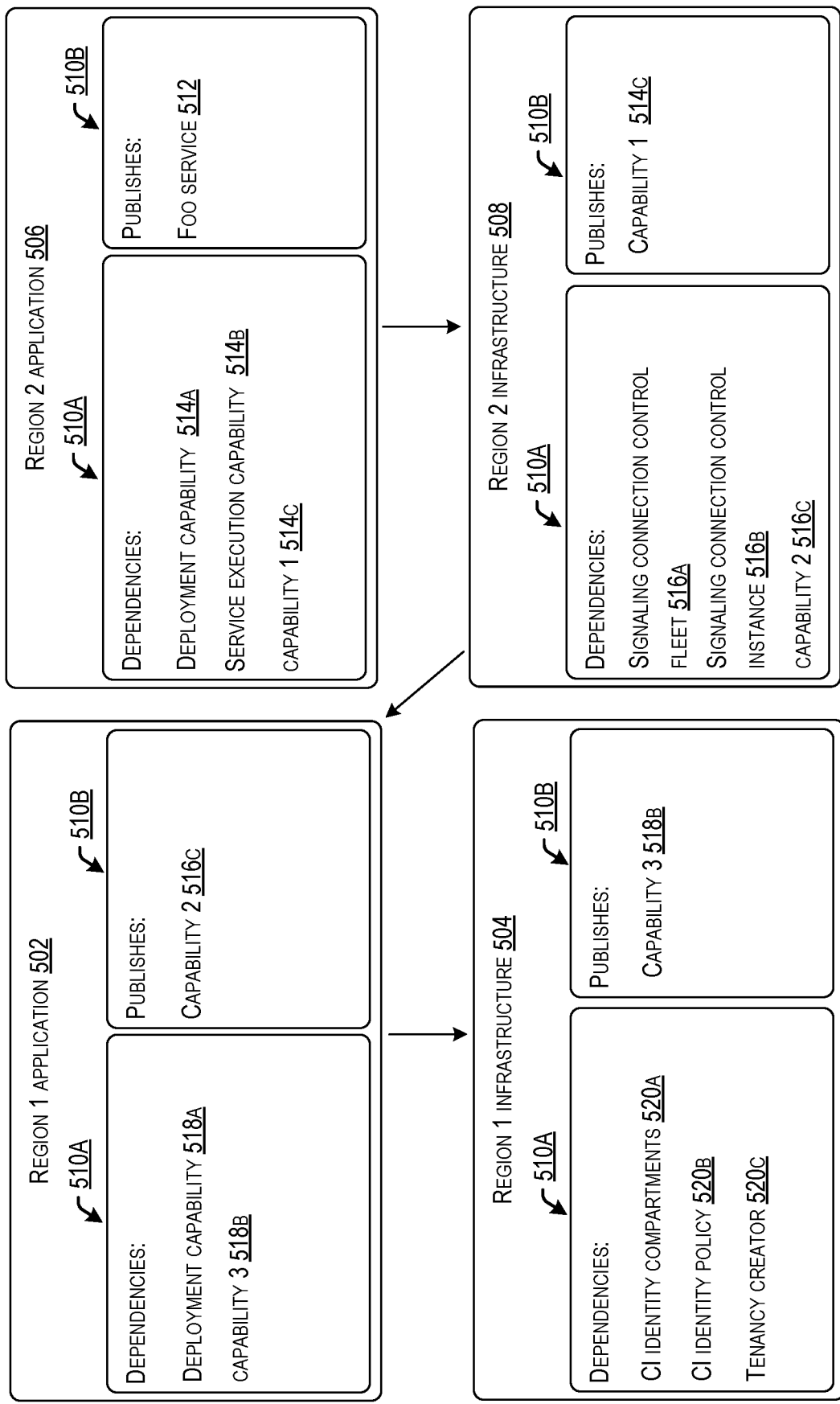
FIG. 5 is a block diagram illustrating dependencies of a capability in a CIOS, according to at least one embodiment.

As described above, a capability can include a number of dependencies across various regions or phases in the CIOS. FIG. 5 is a block diagram 500 illustrating dependencies of a capability in a CIOS. As shown in FIG. 5, multiple regions (e.g., region 1 and region 2) can include varying phases. For example, a first region can include an application phase 502 and an infrastructure phase 504. Each phase can be associated with provisioning infrastructure and/or deploying software. A flock configuration file can include information related to one or more phases. In this example, two flock configuration files (not depicted) may be associated with infrastructure phase 508 and application phase 506, respectively. Infrastructure phase 508 may be associated with provisioning infrastructure resources and application phase 506 may be associated with deploying software to those resources. Further, in this example, a second region can be associated with an application phase 506 and an infrastructure phase 508.

Each phase defined in the flock configuration files can depend on a number of dependent capabilities 510A and a number of capabilities to be published (e.g., publishing capabilities 510B) during execution of the bootstrapping tasks corresponding to the phase. For example, provisioning of a first region infrastructure 504 a third capability 518B may cause (as identified in the corresponding flock configuration file) capability 3 518B to be published. However, region 1 infrastructure 504, capability 3 518B, or a flock configuration file corresponding to either one may be dependent on another capability being available within region 1. For example, capability 3 518B, region 1 infrastructure 504, and the flock configuration file associated with the two may be dependent, as depicted in FIG. 5, on capabilities such as CI identity compartments capability 520A, CI identity policy capability 520B, and tenancy creator 520C. Accordingly, in this example, to publish capability 3 518B (and/or to commence execution of the bootstrapping tasks associated with region 1 infrastructure 504), dependent capabilities 520A-C may first need to be published.

Further, in many instances, to publish a capability, dependent capabilities may need to be published across multiple phases in multiple regions. For example, prior to publishing FOO service 512 (and/or to executing the bootstrapping tasks associated with a flock configuration file that specifies publication of FOO service 512), dependent capabilities 514A-C may first need to be published by region 2 application 506. Further, before dependent capability 1 514C can be published by region 2 infrastructure 508 capabilities 516A-C may first need to be published. Capability 516C (associated with region 1 application 502 during which resources specified in a corresponding flock configuration file are to be bootstrapped within region 1) can further be published at region 1 application 502 and can be dependent on capabilities 518A-B. Capability 3 518B can be published at region 1 infrastructure 504 and can be dependent on capabilities 520A-C. Accordingly, to publish a service (e.g., FOO service 512), multiple dependent capabilities may need to be published across multiple phases in multiple regions of the CIOS.

If dependent capability 514C is not published by region 2 infrastructure 508, FOO service 512 may be unable to be published (and/or bootstrapping tasks identified based on a flock configuration file describing the publication of FOO service 512 may be restricted from being executed). Further, if capability 2 516C and capability 1 514C are not published, the publishing of FOO service 512 may require two publication steps (e.g., a first step to publish capability 2 516C and a second step to publish capability 1 514C). However, in many instances, to publish a capability, resources (e.g., computing resources, virtual machines, etc.) may need to be allocated. Particularly, as the services bootstrapped by CIOS may include a large number of capabilities, there is a need for allocating resources to efficiently publish capabilities in a CIOS.

Figure 6:
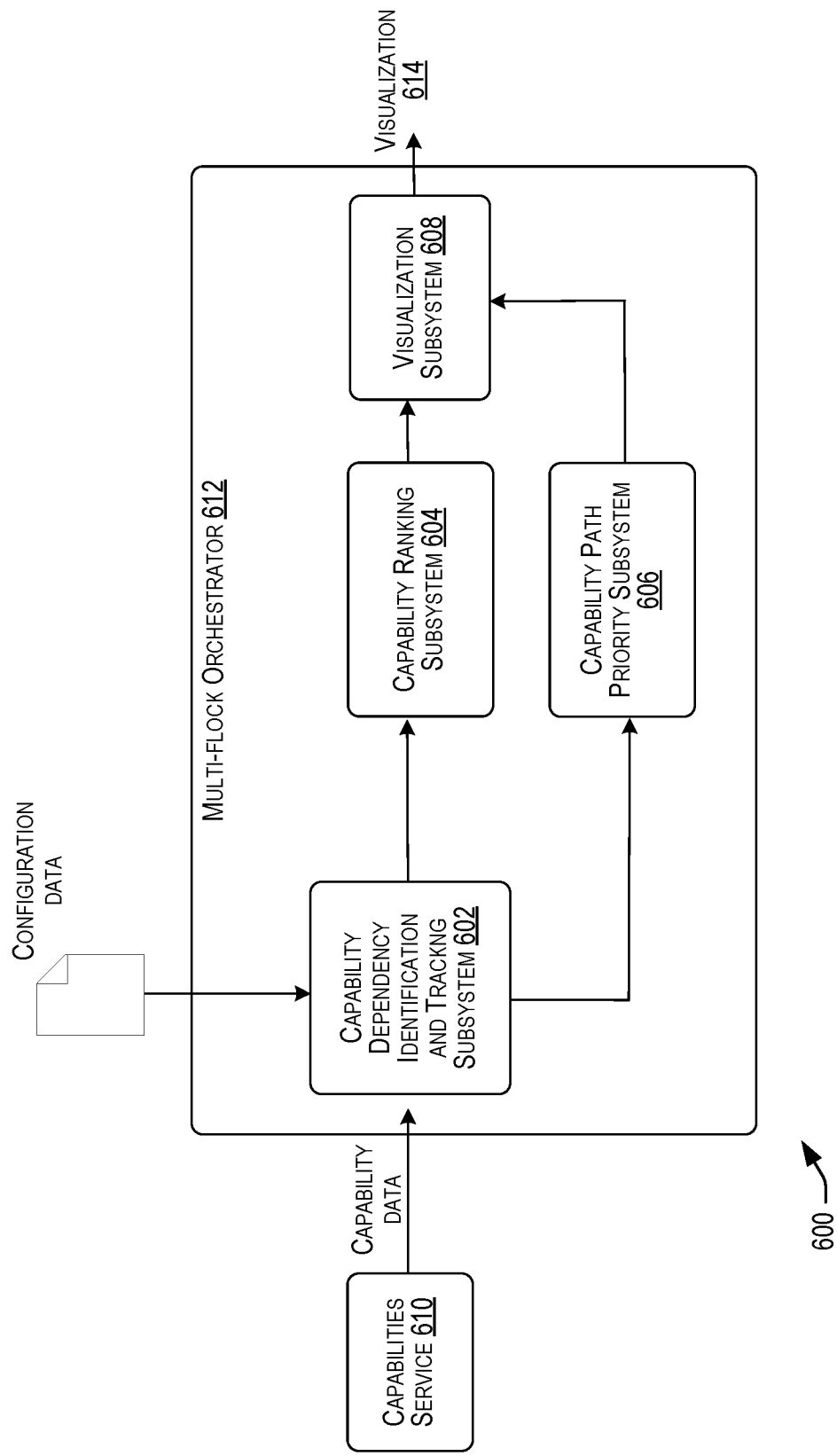
FIG. 6 is a block diagram of an example capability visualization generation system, according to at least one embodiment.

FIG. 6 is a block diagram of an example capability visualization generation system 600. As shown in FIG. 6, a capability visualization generation system 600 can include a capabilities service 610 (e.g., the capabilities service 410 of FIG. 4) and a multi-flock orchestrator 612 (e.g., the multi-flock orchestrator 412 of FIG. 4). The capabilities service 610 can obtain input data from computing instances in the CIOS and process the input data. For instance, the capabilities service 610 can process the input data to identify capabilities, flocks, phases, a status of each capability, etc., which can be included as part of capability data provided to the multi-flock orchestrator 612.

The multi-flock orchestrator 612 can obtain capability data from capabilities service 610 and process the capability data to generate one or more visualizations (e.g., visualization 614) of various aspects of the capability data as described herein. The multi-flock orchestrator 612 can include any of a capability dependency identification and tracking subsystem 602, a capability ranking subsystem 604, a capability path priority subsystem 606, and a visualization subsystem 608. Although FIG. 6 depicts the multi-flock orchestrator 612 as providing the visualization 614 using visualization subsystem 608, in some embodiments, the visualization 614 and visualization subsystem 608 operate as part or are provided by the CIOS Central 108 of FIG. 1.

As described above, the multi-flock orchestrator 612 (e.g., capability dependency identification and tracking subsystem 602) can process configuration data (e.g., one or more flock configuration files) to identify dependencies between capabilities based at least in part on any suitable number of parses of the flock configuration files described above (of which the configuration data of FIG. 6 is an example) to identify dependencies between capabilities/bootstrapping tasks. In some embodiments, a given flock configuration file can indicate any suitable number of capabilities on which that flock (the capabilities of the flock) depend. In some embodiments, the flock configuration file may indicate one or more capabilities that are to be published when bootstrapping the resources of the flock are concluded. Dependency information for a capability can be derived by identifying metadata for a capability (e.g., a capability type, a region or phase for the capability) and identifying (e.g., from the flock configuration file) capabilities that are required to be published before publishing the specified capability (or capabilities) of the flock may commence. In some instances, the capability dependency identification and tracking subsystem 602 can process aspects of each capability and trace requests/calls to each dependent capability to identify dependent capabilities.

The capability dependency identification and tracking subsystem 602 can generate, from any suitable number of flock configuration files, a build dependency graph (e.g., build dependency graph 338) to, among other things, drive the order of bootstrapping task execution within a region, across regions, or the like. The capability dependency identification and tracking subsystem 602 may traverse the build dependency graph to identify bootstrapping tasks to be executed and an order by which those tasks are to be executed. When reaching a node in the graph (e.g., a node corresponding to a flock/set of resources to be bootstrapped), the capability dependency identification and tracking subsystem 602 may identify bootstrapping tasks to be executed and capabilities on which execution of the node's corresponding bootstrapping tasks depend. If the current node's tasks depend on one or more other capabilities being published, the capability dependency tracking subsystem 602 may execute operations for identifying whether those other capabilities have been published. For example, the capability dependency identification and tracking subsystem 602 may identify from any previously received capability data (e.g., capability data received from capabilities service 610) whether those other capabilities have been published. The capability dependency identification and tracking subsystem 602 may use the capabilities identified within that data to track capability availability within the region in order to determine whether to maintain its position or proceed along with its traversal of the build dependency graph.

Further, the capability dependency tracing subsystem 602 can aggregate dependency information for each identified capability. The aggregated dependency information can be processed to derive insights into the capability data, such as identifying unpublished capabilities that, if published, would allow for an ability to publish the greatest number of other capabilities. The capability dependency tracing subsystem 602 can generate capability dependency data specifying, for each capability, dependencies corresponding to those capabilities and a status of each capability in the CIOS (e.g., published/available, not yet published/available, etc.). The capability dependency data can be provided to a capability ranking subsystem 604.

The capability ranking subsystem 604 can process the capability dependency data to assign ranks to the capabilities for use in generating one or more visualizations of the capability data. The ranks to each capability can illustrate an impact of publishing each capability to allow for publishing of other capabilities.

By way of example, three dependent capabilities may depend on publication of a first unpublished capability (e.g., the three capabilities require that the first unpublished capability is published before them) and two other capabilities can depend on a second unpublished capability. In this example, the first unpublished capability can be assigned a score and/or a first rank, and the second unpublished capability can be assigned a second score and/or a second rank that is lower than the first score and/or first rank. These ranks and/or scores may identify that the first unpublished capability is of higher priority than the second unpublished capability based at least in part on the first unpublished capability unblocking a greater number of dependent capabilities (e.g., 3). Said another way, the first unpublished capability may be determined to be higher priority because the number of capabilities which depend on that first unpublished capability is greater than the number of capabilities that depend on the second unpublished capability. Thus, the ranking (or scoring) provided by the capability ranking subsystem 604 can illustrate a priority in allocating resources to publish capabilities in the CIOS.

In some instances, the capability ranking subsystem 604 can rank capabilities based on a status of all dependencies. For instance, a first capability can be unpublished but can depend on a number of capabilities that are already published. Accordingly, the first capability can be allocated resources and can be published. Further, a second capability can be unpublished and can depend on one or more dependent capabilities that are not published. Accordingly, the capabilities on which the second capability depends may need to first be published prior to the second capability being published. These capabilities can be ranked (or scored) based on such differences. For example, a first portion of capabilities including capabilities for which all dependencies are satisfied (e.g., capabilities that depend only on capabilities that have already been published) can be ranked using a first assigned rank (e.g., a particular rank, a particular score, etc.). Further, a second portion of capabilities that depend on one or more currently unpublished capabilities can be ranked using a second assigned rank (e.g., a different rank, a different score, etc.) that is different from the first assigned rank. The second portion of capabilities can also be assigned a number corresponding to the number of capabilities that are required to first be published before publishing each capability of the second portion. The number of capabilities required to be published prior to a given capability can be referred to as "publication steps." For example, a capability can be assigned and/or associated with five publication steps indicating that five other capabilities must be published prior to the publishing of the given capability. Generating visualizations with different rankings for portions of capabilities are further described with respect to FIGS. 7 and 8 below.

A capability path priority subsystem 606 can process the capability dependency data (e.g., as derived from capability dependency identification and tracking system 602) to derive a plurality of paths for unblocking a specified capability or set of capabilities and for selecting a critical path that maximizes efficiency in allocating resources to publish capabilities to unblock a selected capability, service, or flock. Deriving a critical path for a selected capability/flock is discussed in greater detail with respect to FIGS. 9-11 below. Responsive to deriving a critical path for a selected capability/flock, the visualization subsystem 608 can generate one or more visualizations (e.g., visualization 1000) illustrating the critical path.

A visualization subsystem 608 can generate one or more visualizations illustrating various aspects of the capability data. For example, a visualization can include a table (e.g., table 700 in FIG. 7) illustrating flocks (units of change that, when executed, cause one or more corresponding capabilities to be published), ranked by a first ranking. As another example, a visualization can include a table (e.g., table 800 in FIG. 8) illustrating a second portion of flocks that depend on one or more currently unpublished capabilities, ranked by a second ranking and specifying a number of publication steps for each capability. The visualizations can include a number of other data fields, such as a flock, phase, team, or any suitable attribute or aspect associated with a capability and a listing of all dependent capabilities for the capability. As another example, the visualization subsystem 608 can generate one or more visualizations illustrating a critical path, such as visualization 1100 in FIG. 11. Although visualization subsystem 608 is depicted in FIG. 6 as operating as part of the multi-flock orchestrator 612, in some embodiments, the visualization subsystem 608 operates as part of the CIOS Central 108 of FIG. 1.

Figure 7:
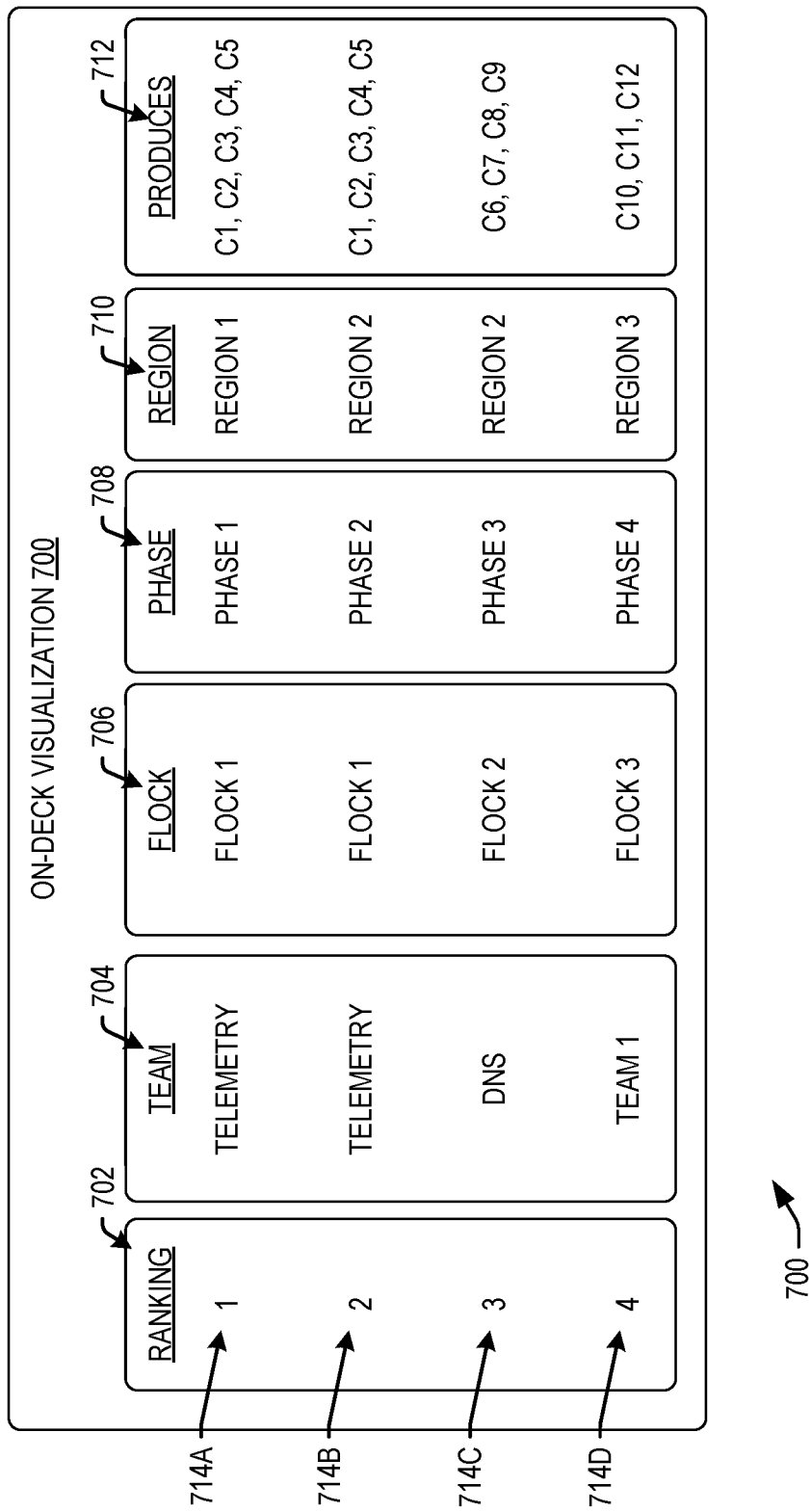
FIG. 7 is a block diagram illustrating an example visualization of on-deck capabilities (e.g., capabilities for which all dependencies have been satisfied), according to at least one embodiment.
Figure 8:
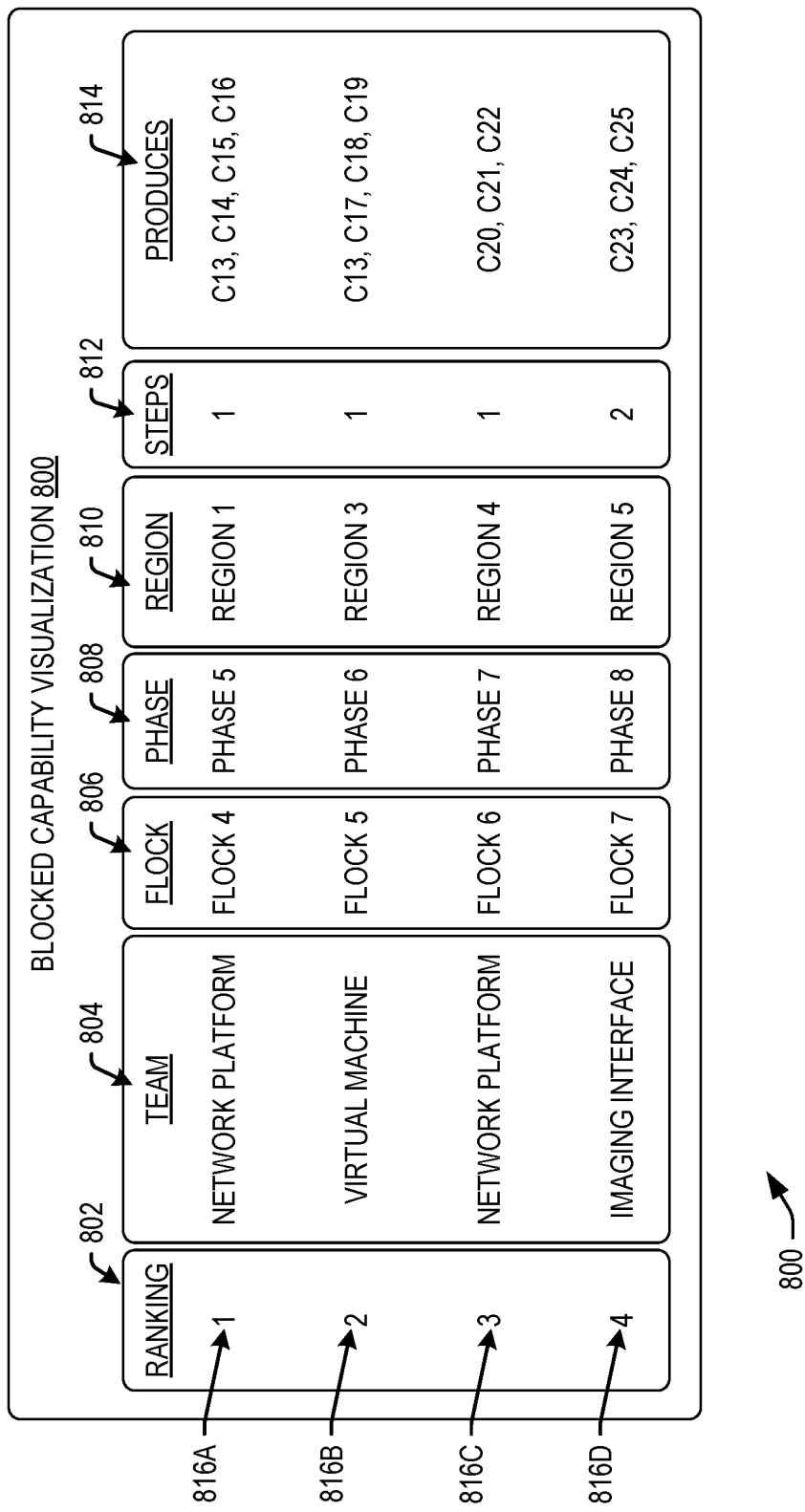
FIG. 8 is a block diagram illustrating an example visualization of blocked capabilities that depend on one or more unpublished capabilities, according to at least one embodiment.
Figure 11:
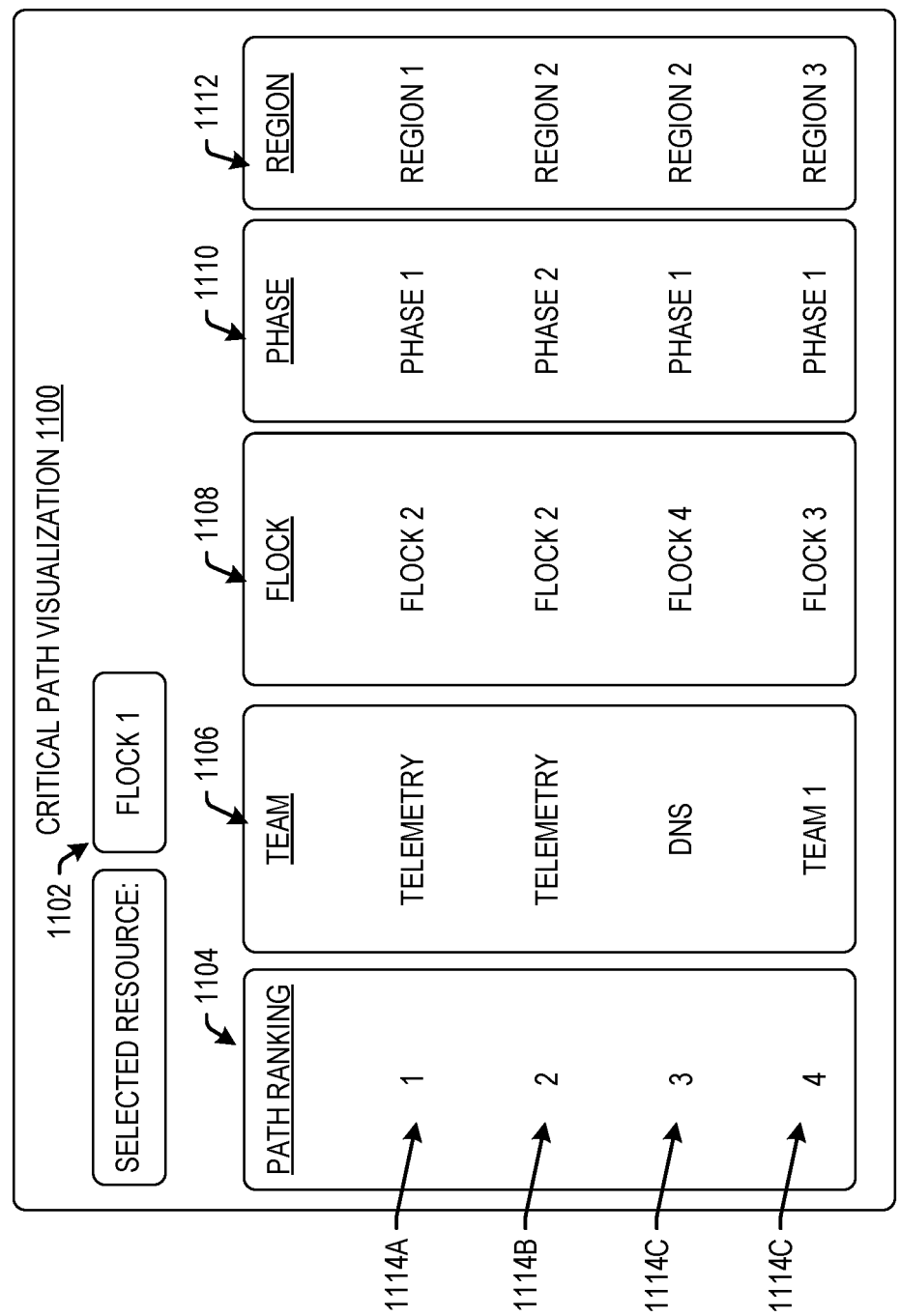
FIG. 11 is an example visualization depicting a critical path for unblocking specified resources, according to at least one embodiment.

The visualizations (e.g., visualization 614, including any suitable combination of visualization 700, 800, and/or 1100 of FIGS. 7, 8, and 11, respectively) can be provided to a client device for further processing and review. For instance, resources can be efficiently allocated to publish capabilities according to the rankings assigned to capabilities in the CIOS. In some embodiments, user input can be received at visualizations 700, 800, and/or 1100 (e.g., examples of user interfaces) to initiate a release (e.g., to initiate bootstrapping task execution for one or more flocks). In some embodiments, user input cannot be provided for entries within a visualization that corresponds to a capability that is dependent on at least one unpublished capability. In some embodiments, user input may be received at the visualizations 700. 800, and/or 1100 to modify an order by which the capabilities are to be published (e.g., an order by which bootstrapping task execution for one or more flocks corresponding to those capabilities are executed).

B. On-Deck Capability Visualization Overview

As described above, capability data for a CIOS can be processed (e.g., by the multi-flock orchestrator 612 of FIG. 6) to assign ranks to various capabilities based on the dependency information for each capability. Further, one or more visualizations can depict capabilities that are arranged by the rankings assigned to the capabilities. For instance, a first visualization can illustrate capabilities for which all the capabilities on which that capability depends have already been published. FIG. 7 is a block diagram illustrating an example visualization of on-deck capabilities (e.g., capabilities for which all dependencies have been satisfied, capabilities that depend on no unpublished capabilities), according to at least one embodiment.

As shown in FIG. 7, an on-deck visualization 700 can include a table or other similar representation of various fields of data. For example, the on-deck visualization 700 can detail aspects of a number of capabilities (e.g., capabilities corresponding to a flock) for which all corresponding dependencies have been satisfied (e.g., published) arranged by a ranking assigned to each capability. The capabilities depicted within visualization 700 depict capabilities that are ready to be published since each capability on which a corresponding flock depends have already been published. These capabilities can be referred to as "on-deck capabilities." By way of example, capabilities C1-C5 (associated with executing a unit of change corresponding to flock 1 in region 1) can be considered on-deck capabilities based at least in part on identifying that all capabilities on which flock 1 in region 1 depend have already been published.

As shown in FIG. 7, a number of fields 702-712 can be provided for a number of capabilities/flocks. Each row in visualization 700 can correspond to a specific flock (e.g., unit of change that, when executed cause one or more capabilities to be published). For example, a first row 714A (e.g., corresponding to flock 1, in region 1) can provide details specific to a first flock (e.g., a unit of change that, when executed, causes capabilities C1-C5 to be published in region 1), and a second row 714B can provide details specific to a second flock (e.g., another unit of change that causes capabilities C1-C5 to be published in region 2). In some embodiments, each of the fields 702-712 can corresponding to a particular flock that depends on no unpublished capabilities. Each of entries 714A-D (e.g., corresponding to respective flocks/phases/regions) can be arranged according to a ranking. For example, flock 1 in region 1 and flock 1 in region 2 may be ranked highest due to the fact that they will cause a greater number of capabilities to be published than the number of capabilities published due to releasing flock 2 in region 2 or flock 3 in region 3.

The rankings can be assigned to each capability based on the dependency information for each capability. For example, a respective ranking (e.g., rankings 702) can be assigned to the flock or the set of capabilities corresponding to the flock based on a number of other capabilities that would be capable of being published (or "unblocked") responsive to the publishing of that set of capabilities corresponding to the flock. Other factors, such as a team, flock, or region specific to each capability can be weighed in assigning a ranking to each capability. The rankings can be indicative of an efficiency in allocating resources to publish capabilities in the CIOS. As depicted in FIG. 7, capability 714A may be ranked highest based at least in part on a determination that publishing capability 714A (as opposed to any of capabilities 714B, 714C, or 714D) will cause the largest number of other capabilities to publish.

In addition to the rankings assigned for each entry 714A-D, other details can be provided. For example, for each entry, a team can be specified (e.g., in the column corresponding to team 704). A team can include a classification or grouping of computing resources for each type of capability. Example teams can relate to telemetry, domain name service (DNS), storage, identity, or any other service/application capable of being implemented in the CIOS. As another example, a flock 706 can be associated with each capability. As noted above, a flock can correspond to one or more resources, capabilities, phases, regions, teams, or any suitable attribute corresponding to a unit of change (e.g., a unit of change involving provisioning an infrastructure component, deploying a software artifact at the infrastructure component, etc.).

For example, the visualization 700 can specify a phase (e.g., via the column corresponding to phase 708), region (e.g., region 710), and capabilities (e.g., capabilities 712) that are produced by executing the unit of change. For example, entry 714A can correspond to executing a unit of change corresponding to flock 1, in region 1, that results in publishing capabilities C1, C2, C3, C4, and C5. In some instances, the visualization 700 can provide details specific to each change/flock, such as the capabilities produced by execution of the change and/or a number of other capabilities that are unblocked responsive to the publishing of each capability. The entries 714A-D can be arranged in the visualization 700 according to ranking 702 for each flock. The capabilities as arranged in the visualization 700 can provide insights into allocating resources for publishing capabilities.

The visualization of capabilities can further rank capabilities with one or more unsatisfied dependencies. For example, in order to publish a first capability, a second capability may first need to be published. Accordingly, a visualization of capabilities can further rank capabilities with one or more unpublished dependent capabilities.

FIG. 8 is a block diagram illustrating an example visualization 800 of blocked capabilities that depend on one or more unpublished capabilities. As noted above, the entries 816A-D illustrated in visualization 800 correspond to flocks and/or corresponding sets of capabilities that depend on one or more unpublished capabilities. For example, to unblock the capabilities corresponding to entry 816A, one step is identified, specifying that one other capability is required to be published in order to publish the capabilities corresponding to entry 816A (e.g., capabilities C13, C14, C15, and C16).

In visualization 800, a second ranking 802 can rank the entries that correspond to respective flocks/capabilities that depend on one or more unpublished capabilities to provide insights into upcoming capabilities to be published. Similar to ranking 702, ranking 802 can rank the capabilities using one or more factors, such as a number of other capabilities that would be unblocked responsive to the publishing of each capability, for example. The visualization 800 can further specify a team 804, flock 806, phase 808, region 810, and a number of capabilities that each flock produces 814 to provide greater detail for each flock and/or capability.

Figure 9:
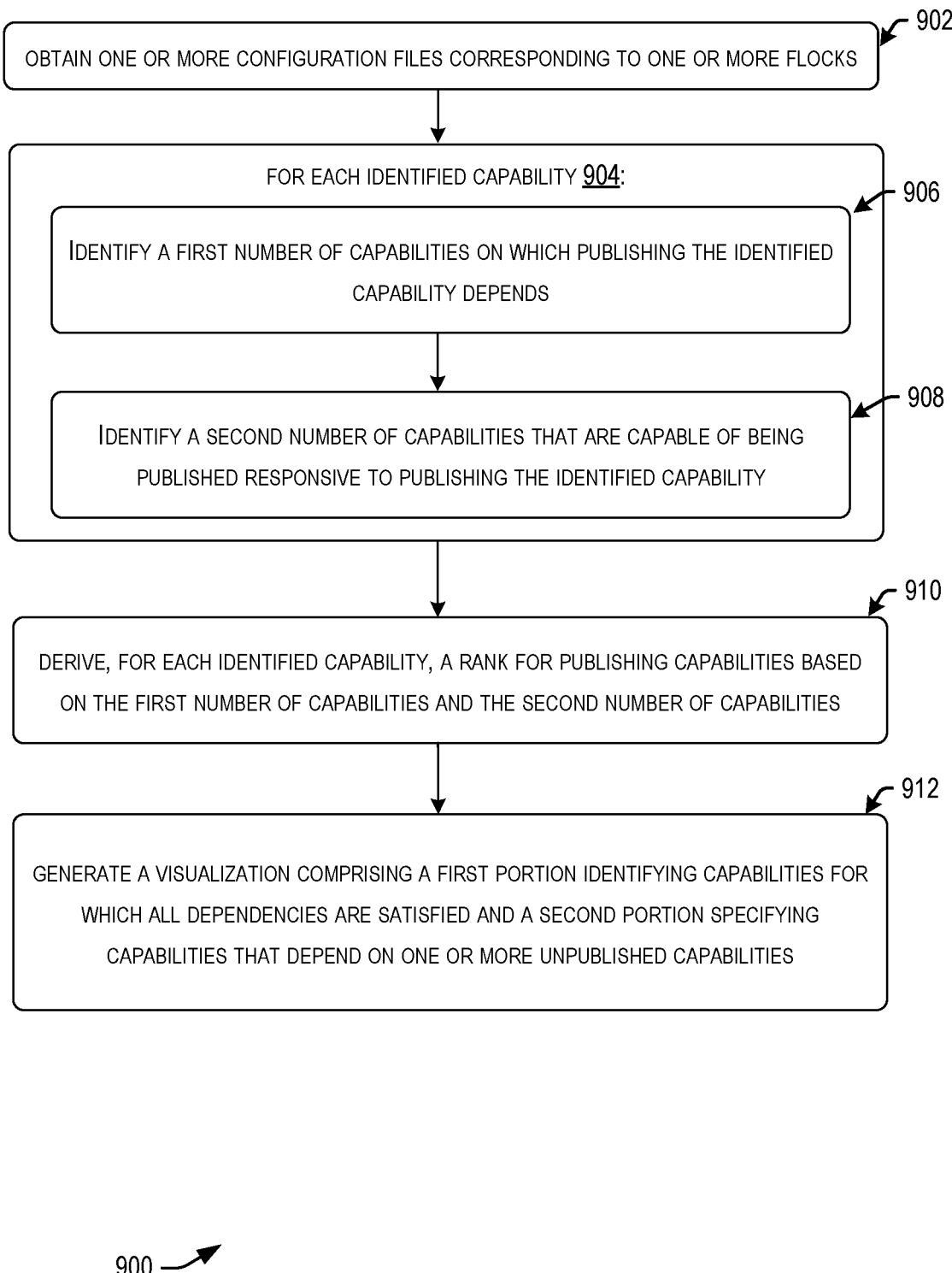
FIG. 9 is a block diagram illustrating an example method for generating a visualization of capabilities, according to at least one embodiment.

C. Flow Process for Generating a Visualization of Capabilities in a Cloud Infrastructure Service In some instances, a method for generating a visualization of capabilities in a cloud infrastructure service is provided. FIG. 9 is a block diagram 900 illustrating an example method for generating a visualization of capabilities. In some embodiments, the method of FIG. 9 may be performed by the multi-flock orchestrator 106, 208, 318, 412, or 612 of FIGS. 1-4 and 6, respectively).

At 902, the method can include obtaining one or more flock configuration files corresponding to one or more respective flocks. The one or more flock configuration files can identify a number of capabilities relating to the respective flocks (e.g., changes corresponding to services, applications, resources, etc.) capable of being implemented in the cloud infrastructure service. For example, a multi-flock orchestrator (e.g., multi-flock orchestrator 412 and 612 of FIGS. 4 and 6, respectively) can obtain a number of flock configuration files corresponding to changes to be made in a given region/data center. The multi-flock orchestrator may perform any suitable number of parses of the flock configuration files to identify capabilities on which the flock (and the capabilities to be published by releasing the flock/bootstrapping the resources associated with the flock) depends, and/or capabilities which depend on the capabilities to be published in connection with releasing the flock/bootstrapping resources associated with the flock.

At 904, each capability identified can be individually processed. Processing each capability can include, at 906, identifying a first number of capabilities on which publishing the identified capability depends. Processing each capability can include, at 908, identifying a second number of capabilities that are capable of being published responsive to publishing the identified capability. In some embodiments, identifying the second number of capabilities may include performing any suitable number of parses of any suitable number of other flock configuration files (e.g., associated with publishing other capabilities). The second number of capabilities can include all capabilities that would be unblocked (e.g., releasable) responsive to the publishing of each corresponding capability. Or in other words, the second number of capabilities can include capabilities that may be ready to publish in response to the publishing of each corresponding capability. An unblocked capability may be one that is determined to depend on no currently unpublished capabilities. Said another way, an unblocked capability is one that depends only on capabilities that have already been published. The combination of the first number of capabilities and second number of capabilities can allow for generating a mapping of the dependency data for each capability (e.g., the build dependency graph 338 of FIG. 3).

At 910, the method can include deriving, a rank (or order) for publishing capabilities (and/or an execution order for executing bootstrapping tasks associated with corresponding flocks) based on the first number of capabilities and the second number of capabilities. The rank (or order) can be based on a total number of capabilities that are unblocked responsive to the publishing of the capability. Further, in some instances, the ranking for each capability can be split into multiple categories of capabilities (e.g., a first category for all capabilities with all dependencies satisfied (all capabilities on which it depends are published) and a second category with one or more dependencies unsatisfied (at least one capability on which it depends remains unpublished). A capability ranking subsystem (e.g., capability ranking subsystem 604) of the multi-flock orchestrator 412 can rank capabilities as described herein.

A rank of each capability can be assigned based on a number of factors. For example, for each capability, a first weight can be derived based on a number of dependent capabilities for each capability (e.g., capabilities on which a given capability depends). Another example weight can include a number of capabilities that may be allowed to publish (and corresponding bootstrapping tasks executed) in response to publishing the given capability. Other weights can be derived for capabilities, such as factors based on a flock specific to each capability or a publication status of each capability, for example. The assigned rank to each capability can specify an efficiency in publishing resources in a CIOS responsive to publishing each corresponding capability.

At 912, a visualization can be generated illustrating insights into the capabilities. For example, the visualization can include a first portion identifying capabilities for which all dependencies are satisfied/resolved (e.g., capabilities that depend on no currently unpublished capabilities) and arranged by the derived rank (or score). An example first portion of the visualization can include on-deck visualization 700 in FIG. 7. The on-deck visualization 700 depicts capabilities that are ready to be published (referred to as "on-deck capabilities). The visualization can further include a second portion specifying capabilities that depend on one or more unpublished dependent capabilities and arranged by the derived rank (or score) for each capability, and a number of capabilities that need to publish (e.g., publication steps) to enable/allow the publishing of each capability. An example second portion of the visualization can include blocked capability visualization 800 in FIG. 8. The visualizations 700 and 800 can arrange capabilities based on an efficiency in allocating resources to build new regions in a cloud infrastructure service.

In some instances, the visualization(s) can be displayed at a client device. Computing resources can be allocated to publish capabilities based on the visualization. In some instances, the first portion or the second portion of the visualization can include a table. The table can include, for each capability displayed in the visualization, a corresponding rank, flock of resources, region in the CIOS, and any other capabilities that are capable of being published responsive to publishing each capability.

As noted above, the multi-flock orchestrator can periodically obtain updated capability data. For instance, the multi-flock orchestrator can identify (e.g., via data provided by the capabilities service discussed above) a change in status of a capability from unpublished to published. Subsequently the visualization can be updated to depict an updated ranking generated by the multi-flock orchestrator for the identified capabilities. The updated ranking can reflect any changes in status to the identified capabilities (e.g., a dependent capability for a specific capability being published). The visualization can be updated based on the updated ranking for the identified capabilities.

Subsequently, a first capability (e.g., a blocked capability) previously illustrated in the second portion of a visualization (e.g., depicting capabilities/flocks that depend on at least one unpublished capability) can be included in/moved to the first portion of the updated visualization based at least in time to identifying that all capabilities on which the first capability depends have been satisfied (e.g., published) and/or that the first capability depends on no unpublished capabilities.

D. Identifying a Critical Path for a Capability or Flock

As described above, a capability can be associated with a number of dependent capabilities (e.g., capabilities on which a given capability depend) and a number of capabilities that are unblocked (e.g., releasable, depend on no unpublished capabilities, etc.) responsive to the publishing of the capability. Accordingly, to publish a capability, all dependent capabilities may first need to be published. Further, as part of building a CIOS or adding computing resources to the CIOS, new capabilities (or flocks including multiple capabilities) can be added. A flock can include a unit of change corresponding to one or more capabilities that are to be published (e.g., when the unit of change has been executed/implemented) in order to provide new functionality to the CIOS.

The capabilities included in the flock can be associated with different capabilities whose publications are needed in order to publish the capabilities in the flock. Accordingly, in order to publish all capabilities in a flock, a number of different capabilities on which capabilities of the flock depend may first need to be published. However, identifying an order by which bootstrapping operations corresponding to these capabilities are to be executed efficiently in a CIOS can be difficult due to the large number of capabilities utilized.

In certain embodiments, capability data (e.g., a set of flock configuration changes corresponding to respective units of change related to bootstrapping resources in a region) for a CIOS can be processed to derive a critical path that efficiently unblocks a selected flock and/or one or more capabilities in the CIOS. A critical path can specify a listing of capabilities (referred to as "dependent capabilities") that, if published, would unblock a flock, allowing for capabilities associated with the flock to be published. A critical path may include capabilities associated with multiple flocks. For example, capability A of flock 1 may depend on capability B of flock 2, which in turn depends on capability C of flock 3. The critical path for capability A may indicate that capability C must be released before capability B, which must in turn be released before capability A.

In response to obtaining a selection of a capability or a flock including multiple capabilities, a ranking can be assigned to all dependent capabilities for the selected capability/flock. The ranking can specify a priority or order for publishing dependencies to efficiently unblock the selected capability flock. Multiple factors can be weighed in deriving a ranking (or order) for each dependent capability, such as a number of selected capabilities that are unblocked in response to publishing each dependent capability, a number of selected capabilities that are dependent on each dependent capability, etc. Responsive to deriving a ranking (or order) for all dependent capabilities, a critical path can be derived that provides a mapping of the capabilities that need to publish in order to unblock a specific capability and/or all capabilities associated with a flock. The critical path can be provided in a visualization specifying details relating to each capability to be published in order to unblock a specified capability or flock. The visualization can provide insights into efficiently allocating resources to unblock a selected capability or flock.

Figure 10:
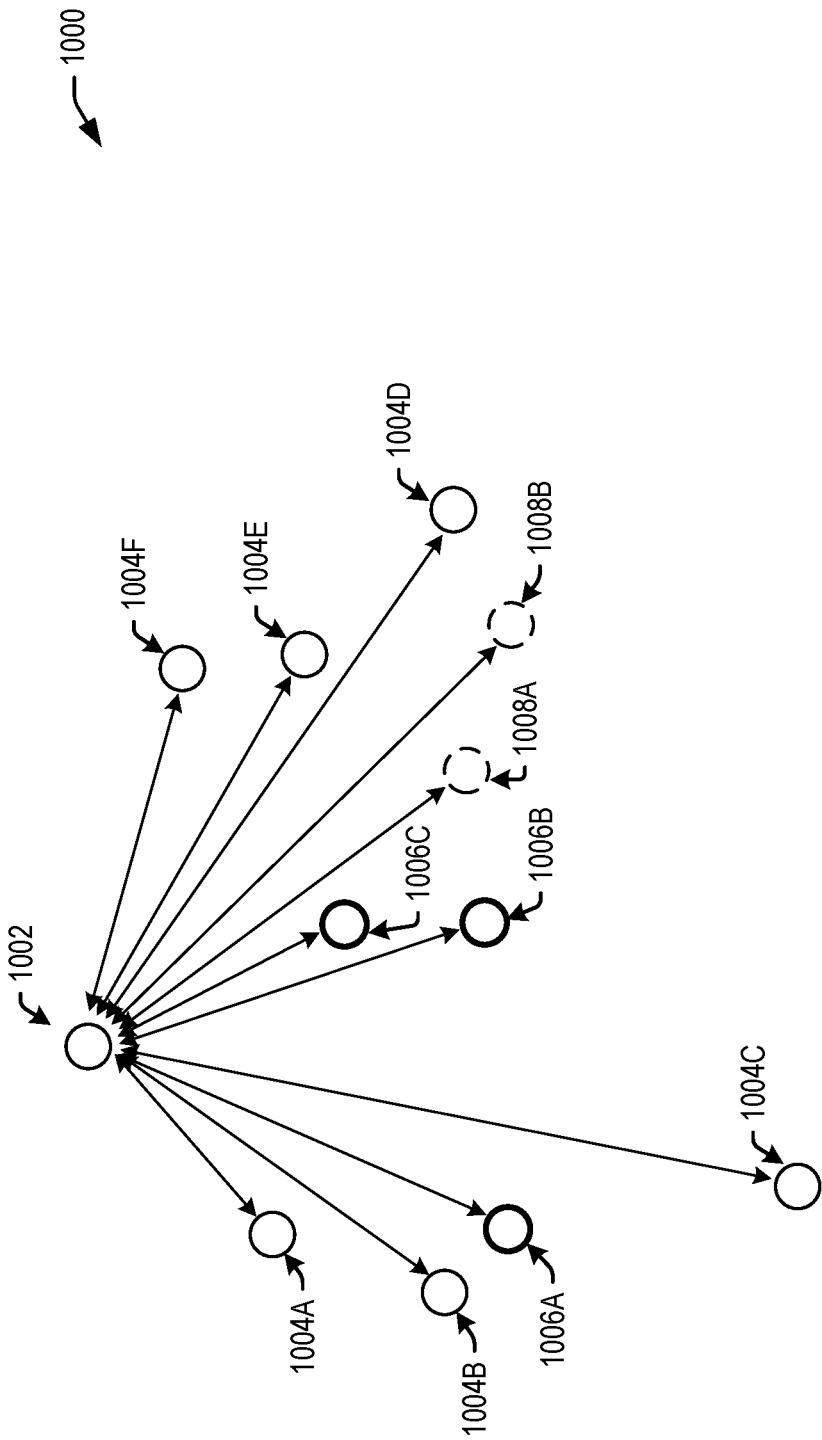
FIG. 10 is a block diagram illustrating an example mapping of dependencies for a selected flock in a CIOS, according to at least one embodiment.

As described above, a flock of resources can include a number of capabilities with varying dependencies. The dependent capabilities can be disposed across various flock configuration files in the CIOS. FIG. 10 is a block diagram 1000 illustrating an example mapping of dependencies for a selected flock in a CIOS.

As shown in FIG. 10, a specified flock 1002 can be provided. Flock 1002 can be selected by a client as part of a query for a critical path to unblock the flock 1002, for example. The flock 1002 can be associated with a number of capabilities to be published on executing the changes corresponding to flock 1002. Further, each capability of the flock can include unique dependent capabilities (e.g., capabilities that are required to first be published before that capability can be published). Additionally, a publication status of each capability and/or dependent capabilities associated and/or corresponding to the flock can be identified. Example publication statuses include, but are not limited to: published, ready to be published, and unpublished.

Further, the selected flock 1002 (or capability) can be associated with multiple dependent capabilities. For example, as shown in FIG. 10, the selected flock 1002 (or capability) can depend on a number of other flocks/capabilities (e.g., flocks 1004A-F, 1006A-C, 1008A-B). Further, the capabilities on which flock 1002 depends can include varying statuses. For instance, a first set of flocks 1008A-B can depend on one or more currently unpublished capabilities. Further, a second set of flocks 1004A-F can be ready to be published (e.g., due to having dependency on no currently unpublished capabilities). Additionally, a third set of flocks 1006A-C may correspond to published capabilities. The status of each flock (and/or each capability corresponding to the flock) can be used to map dependency information for each selected capability and derive a critical path as described herein.

As noted above, a critical path for unblocking a flock (corresponding to the selected flock 1002) can be derived based on dependency information for the capabilities as obtained from a flock configuration file associated with the flock (and/or additional flock configuration files corresponding to those dependencies). As an illustrative example, a first flock can be selected for publishing. The first flock (and/or capabilities of the first flock) can depend on capability A, capability B, and capability C. Each of those capabilities is unpublished. The dependency information can be derived for each capability to identify that capability A depends on unpublished capability D, capability B depends on unpublished capability D and unpublished capability E, and capability C depends on unpublished capability D, unpublished capability E, and unpublished capability F. The dependency on each capability (e.g., dependencies on unpublished capabilities D, E and F) can be used to assign ranks to each capability. For example, in assigning a rank, it can be determined that unpublished capability D would unblock capability A and is required to be published for capabilities A-C to publish. Accordingly, capability D would be assigned a first rank. Further, capability E is required to be published for capabilities A and B to publish and can be assigned a second rank (e.g., due to identifying that publishing capability E unblocks fewer capabilities than publishing capability D). Publication of capability F is required only for capability B to publish and can be assigned a third rank due to determining that capability F does not unblock other capabilities and/or that the fewest number of capabilities (or at least fewer than those that depend on capabilities D or E). The critical path for unblocking the first flock can be derived based on the rankings for the dependent capabilities. For instance, the critical path for unblocking the first flock can include publishing capability D, then publishing capability E, then publishing capability F. The critical path can be used to allocate resources to publish dependent capabilities to unblock a selected flock, for example.

As noted above, the critical path can be provided as part of a visualization. FIG. 11 is an example visualization (e.g., critical path visualization 1100) depicting a critical path for unblocking specified resources. Visualization 1100 can be displayed in response to selection of flock 1002 of FIG. 10. As shown in FIG. 11, the critical path visualization 1100 can specify the selected resource 1102 (e.g., flock 1). Further, the critical path visualization 1100 can include details relating to flocks and/or capabilities on which the selected resource depends. Particularly, the critical path visualization 1100 can provide a critical path for releasing flocks and/or publishing corresponding capabilities to unblock the selected resource 1102 (e.g., flock 1). For instance, the critical path visualization 1100 can provide entries 1114A-D corresponding to at least some of the flocks 1004A-F, 1006A-C, and 1008A-B of FIG. 10) included in the critical path and arranged by a ranking. For example, the entries 1114A-D can be arranged based on a path ranking 1104 for each capability 1114A-D, where the path ranking 1104 indicates the critical path for unblocking the selected resource. In some embodiments, visualization 1100 is scrollable to view any suitable number of dependent capabilities. The critical path indicated in FIG. 11 indicates that the flock corresponding to entry 1114A is to be released/bootstrapped first, followed by the flocks corresponding to entry 1114B, 1114C, and 1114D, respectively.

The visualization 1100 can also include additional details relating to each capability on which the selected resource (e.g., flock 1) depends. For example, for each dependent capability, a team 1106, flock 1108, phase 1110, and/or a region 1112 can be provided for each capability 1114A-D.

Figure 12:
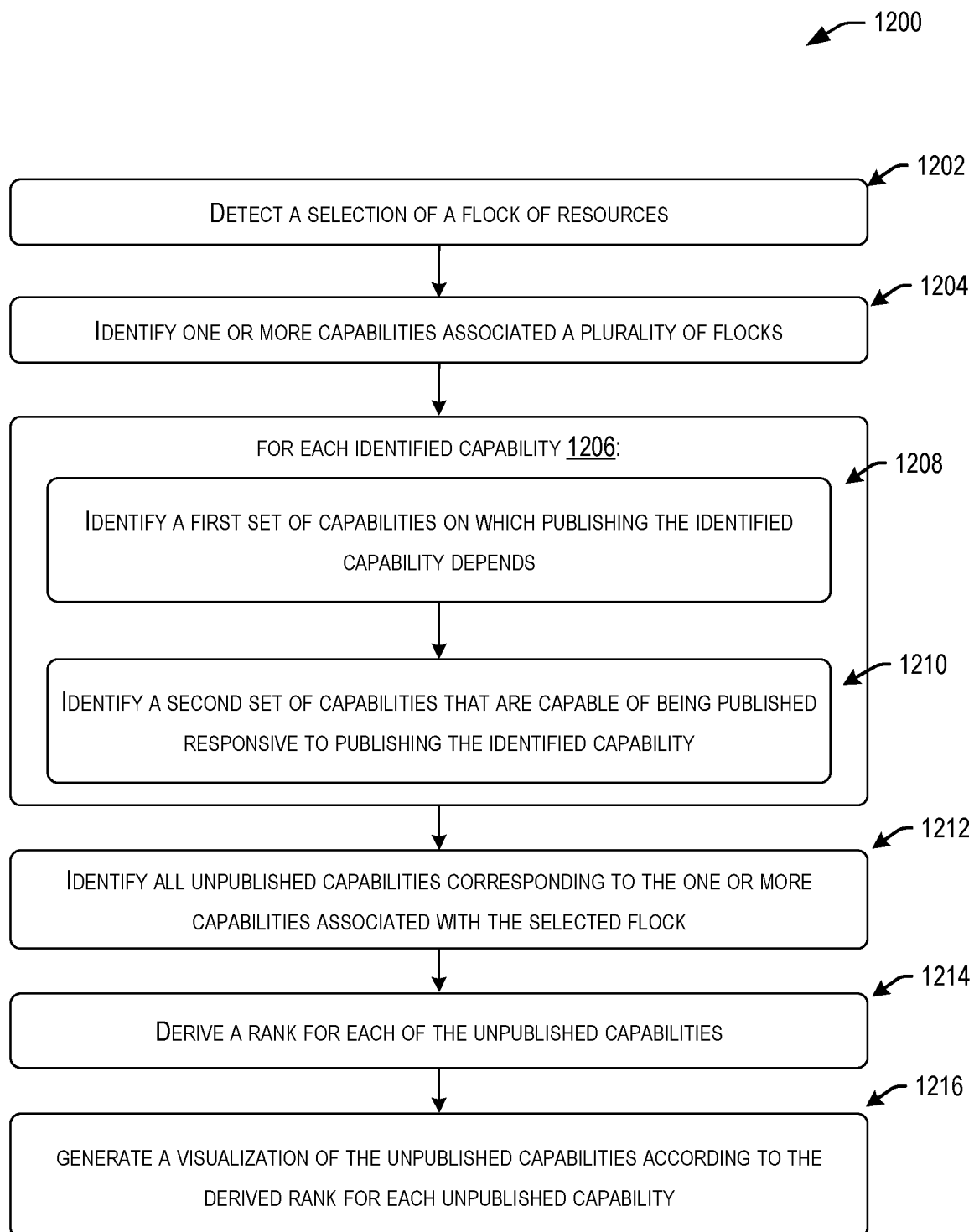
FIG. 12 is a flow process for generating a visualization of a critical path to publish dependent capabilities to unblock a flock of resources, according to at least one embodiment.

E. Flow Process for Generating a Visualization of a Critical Path to Publish Dependent Capabilities to Unblock a Flock of Resources FIG. 12 is a flow process 1200 for generating a visualization of a critical path to publish dependent capabilities to unblock a flock of resources. For example, a multi-flock orchestrator (e.g., multi-flock orchestrator 412 of FIG. 4) can perform the process as described herein.

At 1202, a selection of a flock of resources can be detected (e.g., via one or more user interfaces provided by CIOS (e.g., by CIOS Central)). An example selection may include selecting flock 1 as depicted at 1102 of FIG. 11. In some embodiments, selecting a flock can include obtaining a query for a specific flock from a client (e.g., via a client device). In some instances, detecting a selection of a flock can be from an interaction of a visualization of flocks in a CIOS. For example, a flock (e.g., flock 1002) can be selected from the visualization 1000 of FIG. 10 comprising a plurality of varying flocks. In some embodiments, a capability can be selected for processing as described herein. In some embodiments, selecting flock 1002 can be performed by selecting flock 1002 which, in turn, may navigate the user to critical path visualization 1100 of FIG. 11.

At 1204, one or more capabilities associated with a plurality of flocks (any suitable number of flocks including the selected flock) may be identified (e.g., from one or more parses of the flock configuration file corresponding to the flocks). The capabilities may relate to services or applications capable of being implemented within the cloud infrastructure service.

As noted above, a flock can include one or more capabilities that are individually associated with other capabilities that first need to be published in order to publish each capability of the flock. Any suitable number of flock configuration files can be processed in order to identify the capabilities on which each respective capability/flock depends. Accordingly, these identified dependencies between capabilities and/or flocks may be used to derive a critical path for the selected flock.

At 1206, each capability identified from the one or more flock configuration files can be individually processed. Processing each capability can include, at 1208, identifying a first number of capabilities on which publishing the identified capability depends. Each of the first number of capabilities can include dependent capabilities that are required to be published prior to the publishing of each corresponding capability. Processing each capability can include, at 1210, identifying a second number of capabilities that can be published as a result of publishing the identified capability. The second number of capabilities can include all capabilities that would be unblocked due to the publishing of each corresponding capability. The combination of the first number of capabilities and second number of capabilities can allow for generating a mapping of the dependency data for each capability (e.g., the build dependency graph 338 of FIG. 3).

As noted above, a flock of resources can include multiple capabilities. Further, each of the selected capabilities can be associated with one or more dependent capabilities that need to be published to unblock each selected capability. For example, the first set of capabilities as derived in 1208 can be identified for each capability on which the selected flock ultimately depends. The selected flock/capability may depend on a second flock/capability (as identified from a corresponding flock configuration file), the second flock/capability may depend on a third flock/capability (as identified from a flock configuration file corresponding to the second flock/capability), and so on. The superset of all capabilities corresponding to any suitable number of flocks/capabilities on which the selected flock's one or more capabilities ultimately depend. Additionally, at 1212, all unpublished capabilities can be identified from the first set of flocks/capabilities. These would include only unpublished capabilities on which the selected flock ultimately depends. The unpublished capabilities identified in 1212 can be ranked and assigned as part of a critical path for unblocking the selected capabilities as described below.

At 1214, a rank for each of the unpublished capabilities can be derived. The unpublished dependent capabilities can be assigned ranks based on multiple weighing factors to each of the unpublished dependent capabilities. For example, a first weighing factor can include a number of the selected capabilities that would be unblocked responsive to the publishing of each unpublished capability of the first set of capabilities. A second weighing factor can include a number of the selected capabilities that are dependent to each unpublished capability of the first set of capabilities. Other weighing factors can be applied to each unpublished capability and used to assign ranks to each unpublished capability as described herein. The rankings assigned to each unpublished dependent capability can be used to arrange execution of bootstrapping operations corresponding to those flocks and/or capabilities for the critical path to unblock the selected flock.

At 1216, a visualization (e.g., visualization 1100 of FIG. 11) can be generated of the unpublished capabilities arranged according to the derived rank for each unpublished capability. The visualization can specify a critical path in unblocking the resources. Further, the unpublished dependent capabilities arranged by ranking can maximize the efficiency in publishing capabilities to unblock the selected flock. The visualization can be provided to a client device for the client to allocate resources to unblock the selected flock of resources.

F. Example Embodiments

A first example embodiment provides a method identifying dependencies between capabilities of a cloud computing environment under build. The method may comprise identifying, by a cloud infrastructure orchestration service from one or more configuration files, a collective set of capabilities individually relating to services or applications to be bootstrapped by the cloud infrastructure orchestration service within the cloud computing environment under build. The method may comprise identifying, by the cloud infrastructure orchestration service for each respective capability of the collective set of capabilities, a first set of capabilities on which publishing the respective capability depends. The method may comprise generating, by the cloud infrastructure orchestration service, a visualization that includes: a first portion specifying a first subset of capabilities of the collective set of capabilities that depend on no unpublished capabilities based at least in part on identifying the first set of capabilities, and a second portion specifying a second subset of capabilities of the collective set of capabilities that depend on one or more currently unpublished capabilities.

In some embodiments, the second portion further specifies a respective number of unpublished capabilities for each capability. In some embodiments, publication of each capability may be dependent on publication of the respective number of unpublished capabilities. In some embodiments, the first portion or the second portion of the visualization comprise respective tables that indicate, for each specified capability in the first portion or the second portion a corresponding flock, and a corresponding region.

In some embodiments, the method may comprise identifying, from capabilities data obtained from a capabilities service, one or more updates to a publication status of individual capabilities of the collective set of capabilities. The method may comprise generating an updated ranking based at least in part on the one or more updates. The method may comprise generating an updated visualization comprising: an updated first portion identifying a third subset of capabilities of the collective set of capabilities that depend on no unpublished capabilities according to the one or more updates, and an updated second portion identifying a third subset of capabilities of the collective set of capabilities that depend on a set of currently unpublished capabilities according to the one or more updates.

In some embodiments, a first capability initially included in the second portion of the visualization is newly included in the updated first portion of the updated visualization responsive to identifying, from the one or more updates, that a second capability on which the first capability depends has published.

In some embodiments, the method may comprise assigning a ranking to the second subset of capabilities based at least in part on identifying a number of the first set of capabilities corresponding to each of the second subset of capabilities. In some embodiments, the ranking is generated based at least in part on identifying, for each respective capability of the collective set of capabilities, a second set of capabilities that are capable of being published responsive to publishing the respective capability, wherein a second visualization is generated to depict the second set of capabilities.

A second method (e.g., a method for determining, by a cloud infrastructure orchestration service, a critical path identifying an order for bootstrapping a subset of resources within a data center under build) is disclosed. In some embodiments, the method comprises identifying, by the cloud infrastructure orchestration service from one or more configuration files, a collective set of capabilities individually relating to resources to be bootstrapped by the cloud infrastructure orchestration service within the data center under build. The method may comprise identifying, by the cloud infrastructure orchestration service for each respective capability of the collective set of capabilities, a first set of capabilities on which publishing the respective capability depends. The method may comprise identifying user input identifying a selected flock. The method may comprise identifying, by the cloud infrastructure orchestration service for the selected flock, one or more unpublished capabilities corresponding to at least one of the one or more capabilities associated with the selected flock. The method may comprise ranking the unpublished capabilities. The method may comprise generating a visualization identifying at least a portion of the unpublished capabilities corresponding to the selected flock. In some embodiments, the unpublished capabilities may be identified and arranged in accordance with the ranking.

In some embodiments, the ranking of the unpublished capabilities corresponding to the selected flock specifies at least the critical path identifying the order for bootstrapping the subset of resources within the data center under build.

In some embodiments, the method may comprise causing display of the visualization at a client device, wherein computing resources are allocated to bootstrap resources corresponding to the unpublished capabilities based at least in part on the ranking.

In some embodiments, the visualization comprises a table that includes, for each unpublished capability: an assigned rank, a corresponding flock, and a corresponding region in the cloud infrastructure service.

In some embodiments, the method may comprise identifying, from capabilities data obtained from a capabilities service, one or more updates to a publication status of individual capabilities of the unpublished capabilities. The method may comprise updating the visualization to identify a previously unpublished capability as being published based at least in part on the one or more updates.

In some embodiments, the method may comprise deriving an updated ranking for remaining unpublished capabilities that are identified as being unpublished after receipt of the one or more updates, wherein updating the visualization causes the remaining unpublished capabilities to be arranged within the visualization according to the updated ranking.

In some embodiments, the ranking is derived based at least in part on identifying, for a respective unpublished capability, a set of capabilities that are capable of being published responsive to publishing the respective unpublished capability.

Another embodiment is directed to a cloud-computing system comprising one or more processors and one or more memories storing computer executable instructions that, when executed by the one or more processors, cause a computing device, component, or service (e.g., any suitable combination of the components of the CIOS of FIG. 1) to perform any suitable combination of the method(s) disclosed herein.

Still another embodiment is directed to a non-transitory computer-readable medium storing computer-executable instructions that, when executed by one or more processors of a cloud-computing system, cause a computing device, component, or service (e.g., any suitable combination of the components of the CIOS of FIG. 1) to perform any suitable combination of the method(s) disclosed herein.

G. IaaS Overview

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (e.g., billing, monitoring, logging, load balancing and clustering, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 13:
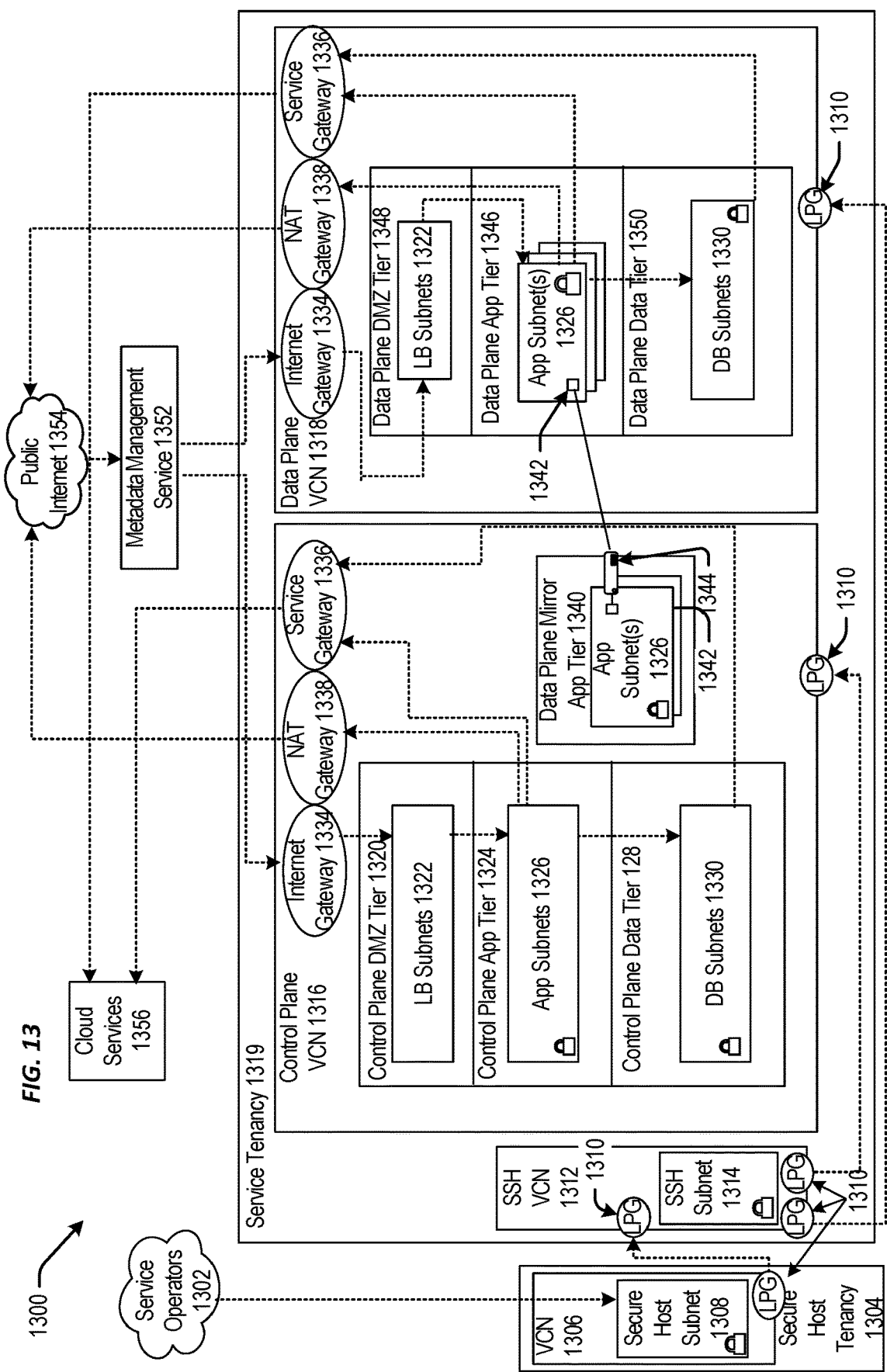
FIG. 13 is a block diagram illustrating one pattern for implementing a cloud infrastructure as a service system, according to at least one embodiment.

FIG. 13 is a block diagram 1300 illustrating an example pattern of an IaaS architecture, according to at least one embodiment. Service operators 1302 can be communicatively coupled to a secure host tenancy 1304 that can include a virtual cloud network (VCN) 1306 and a secure host subnet 1308. In some examples, the service operators 1302 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 15, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 1306 and/or the Internet.

The VCN 1306 can include a local peering gateway (LPG) 1310 that can be communicatively coupled to a secure shell (SSH) VCN 1312 via an LPG 1310 contained in the SSH VCN 1312. The SSH VCN 1312 can include an SSH subnet 1314, and the SSH VCN 1312 can be communicatively coupled to a control plane VCN 1316 via the LPG 1310 contained in the control plane VCN 1316. Also, the SSH VCN 1312 can be communicatively coupled to a data plane VCN 1318 via an LPG 1310. The control plane VCN 1316 and the data plane VCN 1318 can be contained in a service tenancy 1319 that can be owned and/or operated by the IaaS provider.

The control plane VCN 1316 can include a control plane demilitarized zone (DMZ) tier 1320 that acts as a perimeter network (e.g., portions of a corporate network between the corporate intranet and external networks). The DMZ-based servers may have restricted responsibilities and help keep breaches contained. Additionally, the DMZ tier 1320 can include one or more load balancer (LB) subnet(s) 1322, a control plane app tier 1324 that can include app subnet(s) 1326, a control plane data tier 1328 that can include database (DB) subnet(s) 1330 (e.g., frontend DB subnet(s) and/or backend DB subnet(s)). The LB subnet(s) 1322 contained in the control plane DMZ tier 1320 can be communicatively coupled to the app subnet(s) 1326 contained in the control plane app tier 1324 and an Internet gateway 1334 that can be contained in the control plane VCN 1316, and the app subnet(s) 1326 can be communicatively coupled to the DB subnet(s) 1330 contained in the control plane data tier 1328 and a service gateway 1336 and a network address translation (NAT) gateway 1338. The control plane VCN 1316 can include the service gateway 1336 and the NAT gateway 1338.

The control plane VCN 1316 can include a data plane mirror app tier 1340 that can include app subnet(s) 1326. The app subnet(s) 1326 contained in the data plane mirror app tier 1340 can include a virtual network interface controller (VNIC) 1342 that can execute a compute instance 1344. The compute instance 1344 can communicatively couple the app subnet(s) 1326 of the data plane mirror app tier 1340 to app subnet(s) 1326 that can be contained in a data plane app tier 1346.

The data plane VCN 1318 can include the data plane app tier 1346, a data plane DMZ tier 1348, and a data plane data tier 1350. The data plane DMZ tier 1348 can include LB subnet(s) 1322 that can be communicatively coupled to the app subnet(s) 1326 of the data plane app tier 1346 and the Internet gateway 1334 of the data plane VCN 1318. The app subnet(s) 1326 can be communicatively coupled to the service gateway 1336 of the data plane VCN 1318 and the NAT gateway 1338 of the data plane VCN 1318. The data plane data tier 1350 can also include the DB subnet(s) 1330 that can be communicatively coupled to the app subnet(s) 1326 of the data plane app tier 1346.

The Internet gateway 1334 of the control plane VCN 1316 and of the data plane VCN 1318 can be communicatively coupled to a metadata management service 1352 that can be communicatively coupled to public Internet 1354. Public Internet 1354 can be communicatively coupled to the NAT gateway 1338 of the control plane VCN 1316 and of the data plane VCN 1318. The service gateway 1336 of the control plane VCN 1316 and of the data plane VCN 1318 can be communicatively couple to cloud services 1356.

In some examples, the service gateway 1336 of the control plane VCN 1316 or of the data plane VCN 1318 can make application programming interface (API) calls to cloud services 1356 without going through public Internet 1354. The API calls to cloud services 1356 from the service gateway 1336 can be one-way: the service gateway 1336 can make API calls to cloud services 1356, and cloud services 1356 can send requested data to the service gateway 1336. But, cloud services 1356 may not initiate API calls to the service gateway 1336.

In some examples, the secure host tenancy 1304 can be directly connected to the service tenancy 1319, which may be otherwise isolated. The secure host subnet 1308 can communicate with the SSH subnet 1314 through an LPG 1310 that may enable two-way communication over an otherwise isolated system. Connecting the secure host subnet 1308 to the SSH subnet 1314 may give the secure host subnet 1308 access to other entities within the service tenancy 1319.

The control plane VCN 1316 may allow users of the service tenancy 1319 to set up or otherwise provision desired resources. Desired resources provisioned in the control plane VCN 1316 may be deployed or otherwise used in the data plane VCN 1318. In some examples, the control plane VCN 1316 can be isolated from the data plane VCN 1318, and the data plane mirror app tier 1340 of the control plane VCN 1316 can communicate with the data plane app tier 1346 of the data plane VCN 1318 via VNICs 1342 that can be contained in the data plane mirror app tier 1340 and the data plane app tier 1346.

In some examples, users of the system, or customers, can make requests, for example create, read, update, or delete (CRUD) operations, through public Internet 1354 that can communicate the requests to the metadata management service 1352. The metadata management service 1352 can communicate the request to the control plane VCN 1316 through the Internet gateway 1334. The request can be received by the LB subnet(s) 1322 contained in the control plane DMZ tier 1320. The LB subnet(s) 1322 may determine that the request is valid, and in response to this determination, the LB subnet(s) 1322 can transmit the request to app subnet(s) 1326 contained in the control plane app tier 1324. If the request is validated and requires a call to public Internet 1354, the call to public Internet 1354 may be transmitted to the NAT gateway 1338 that can make the call to public Internet 1354. Memory that may be desired to be stored by the request can be stored in the DB subnet(s) 1330.

In some examples, the data plane mirror app tier 1340 can facilitate direct communication between the control plane VCN 1316 and the data plane VCN 1318. For example, changes, updates, or other suitable modifications to configuration may be desired to be applied to the resources contained in the data plane VCN 1318. Via a VNIC 1342, the control plane VCN 1316 can directly communicate with, and can thereby execute the changes, updates, or other suitable modifications to configuration to, resources contained in the data plane VCN 1318.

In some embodiments, the control plane VCN 1316 and the data plane VCN 1318 can be contained in the service tenancy 1319. In this case, the user, or the customer, of the system may not own or operate either the control plane VCN 1316 or the data plane VCN 1318. Instead, the IaaS provider may own or operate the control plane VCN 1316 and the data plane VCN 1318, both of which may be contained in the service tenancy 1319. This embodiment can enable isolation of networks that may prevent users or customers from interacting with other users', or other customers', resources. Also, this embodiment may allow users or customers of the system to store databases privately without needing to rely on public Internet 1354, which may not have a desired level of threat prevention, for storage.

In other embodiments, the LB subnet(s) 1322 contained in the control plane VCN 1316 can be configured to receive a signal from the service gateway 1336. In this embodiment, the control plane VCN 1316 and the data plane VCN 1318 may be configured to be called by a customer of the IaaS provider without calling public Internet 1354. Customers of the IaaS provider may desire this embodiment since database(s) that the customers use may be controlled by the IaaS provider and may be stored on the service tenancy 1319, which may be isolated from public Internet 1354.

Figure 14:
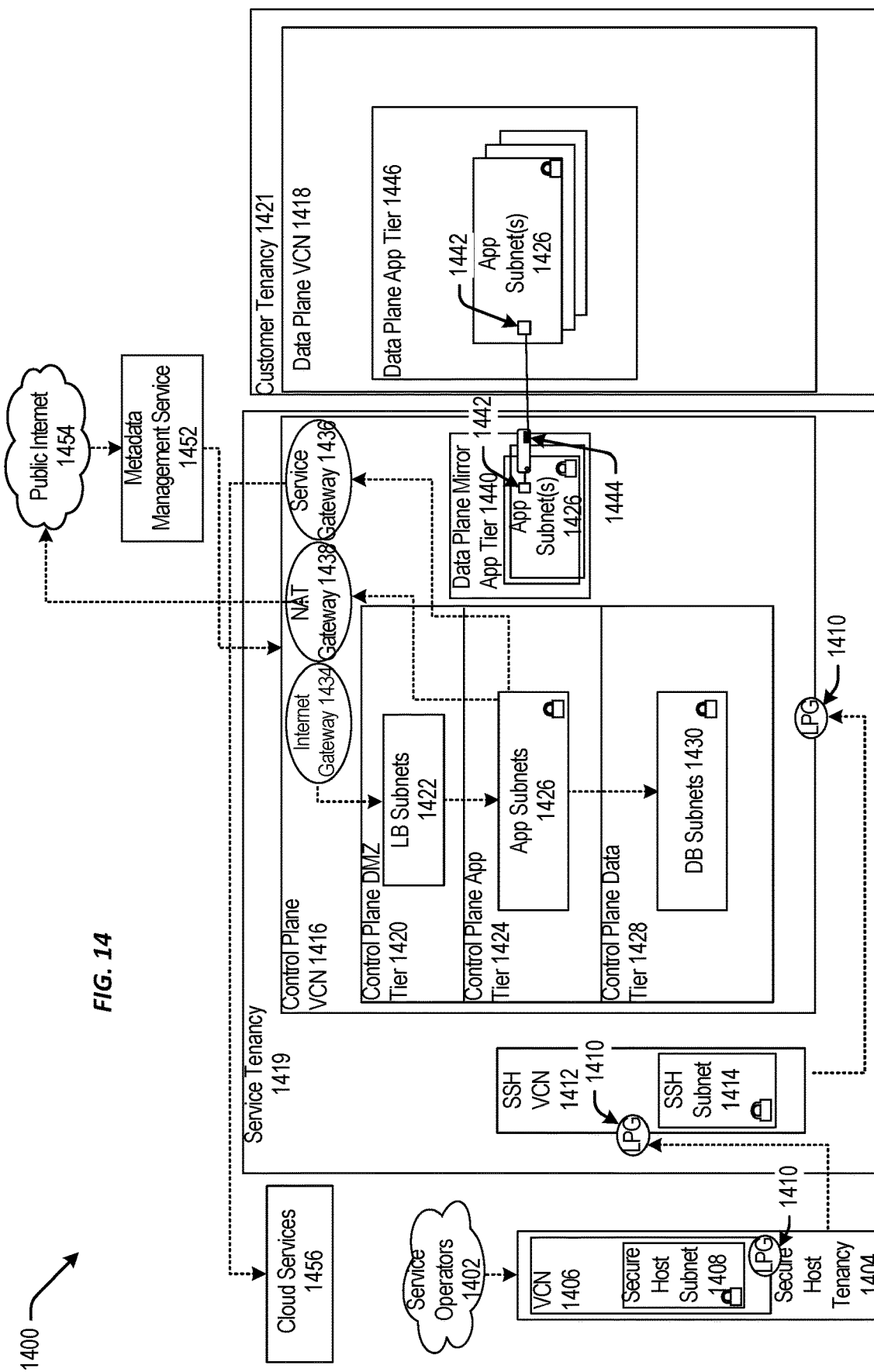
FIG. 14 is a block diagram illustrating another pattern for implementing a cloud infrastructure as a service system, according to at least one embodiment.

FIG. 14 is a block diagram 1400 illustrating another example pattern of an IaaS architecture, according to at least one embodiment. Service operators 1402 (e.g. service operators 1302 of FIG. 13) can be communicatively coupled to a secure host tenancy 1404 (e.g. the secure host tenancy 1304 of FIG. 13) that can include a virtual cloud network (VCN) 1406 (e.g. the VCN 1306 of FIG. 13) and a secure host subnet 1408 (e.g. the secure host subnet 1308 of FIG. 13). The VCN 1406 can include a local peering gateway (LPG) 1410 (e.g. the LPG 1310 of FIG. 13) that can be communicatively coupled to a secure shell (SSH) VCN 1412 (e.g. the SSH VCN 1312 of FIG. 13) via an LPG 1310 contained in the SSH VCN 1412. The SSH VCN 1412 can include an SSH subnet 1414 (e.g. the SSH subnet 1314 of FIG. 13), and the SSH VCN 1412 can be communicatively coupled to a control plane VCN 1416 (e.g. the control plane VCN 1316 of FIG. 13) via an LPG 1410 contained in the control plane VCN 1416. The control plane VCN 1416 can be contained in a service tenancy 1419 (e.g. the service tenancy 1319 of FIG. 13), and the data plane VCN 1418 (e.g. the data plane VCN 1318 of FIG. 13) can be contained in a customer tenancy 1421 that may be owned or operated by users, or customers, of the system.

The control plane VCN 1416 can include a control plane DMZ tier 1420 (e.g. the control plane DMZ tier 1320 of FIG. 13) that can include LB subnet(s) 1422 (e.g. LB subnet(s) 1322 of FIG. 13), a control plane app tier 1424 (e.g. the control plane app tier 1324 of FIG. 13) that can include app subnet(s) 1426 (e.g. app subnet(s) 1326 of FIG. 13), a control plane data tier 1428 (e.g. the control plane data tier 1328 of FIG. 13) that can include database (DB) subnet(s) 1430 (e.g. similar to DB subnet(s) 1330 of FIG. 13). The LB subnet(s) 1422 contained in the control plane DMZ tier 1420 can be communicatively coupled to the app subnet(s) 1426 contained in the control plane app tier 1424 and an Internet gateway 1434 (e.g. the Internet gateway 1334 of FIG. 13) that can be contained in the control plane VCN 1416, and the app subnet(s) 1426 can be communicatively coupled to the DB subnet(s) 1430 contained in the control plane data tier 1428 and a service gateway 1436 (e.g. the service gateway of FIG. 13) and a network address translation (NAT) gateway 1438 (e.g. the NAT gateway 1338 of FIG. 13). The control plane VCN 1416 can include the service gateway 1436 and the NAT gateway 1438.

The control plane VCN 1416 can include a data plane mirror app tier 1440 (e.g. the data plane mirror app tier 1340 of FIG. 13) that can include app subnet(s) 1426. The app subnet(s) 1426 contained in the data plane mirror app tier 1440 can include a virtual network interface controller (VNIC) 1442 (e.g. the VNIC of 1342) that can execute a compute instance 1444 (e.g. similar to the compute instance 1344 of FIG. 13). The compute instance 1444 can facilitate communication between the app subnet(s) 1426 of the data plane mirror app tier 1440 and the app subnet(s) 1426 that can be contained in a data plane app tier 1446 (e.g. the data plane app tier 1346 of FIG. 13) via the VNIC 1442 contained in the data plane mirror app tier 1440 and the VNIC 1442 contained in the data plane app tier 1446.

The Internet gateway 1434 contained in the control plane VCN 1416 can be communicatively coupled to a metadata management service 1452 (e.g. the metadata management service 1352 of FIG. 13) that can be communicatively coupled to public Internet 1454 (e.g. public Internet 1354 of FIG. 13). Public Internet 1454 can be communicatively coupled to the NAT gateway 1438 contained in the control plane VCN 1416. The service gateway 1436 contained in the control plane VCN 1416 can be communicatively couple to cloud services 1456 (e.g. cloud services 1356 of FIG. 13).

In some examples, the data plane VCN 1418 can be contained in the customer tenancy 1421. In this case, the IaaS provider may provide the control plane VCN 1416 for each customer, and the IaaS provider may, for each customer, set up a unique compute instance 1444 that is contained in the service tenancy 1419. Each compute instance 1444 may allow communication between the control plane VCN 1416, contained in the service tenancy 1419, and the data plane VCN 1418 that is contained in the customer tenancy 1421. The compute instance 1444 may allow resources, that are provisioned in the control plane VCN 1416 that is contained in the service tenancy 1419, to be deployed or otherwise used in the data plane VCN 1418 that is contained in the customer tenancy 1421.

In other examples, the customer of the IaaS provider may have databases that live in the customer tenancy 1421. In this example, the control plane VCN 1416 can include the data plane mirror app tier 1440 that can include app subnet(s) 1426. The data plane mirror app tier 1440 can reside in the data plane VCN 1418, but the data plane mirror app tier 1440 may not live in the data plane VCN 1418. That is, the data plane mirror app tier 1440 may have access to the customer tenancy 1421, but the data plane mirror app tier 1440 may not exist in the data plane VCN 1418 or be owned or operated by the customer of the IaaS provider. The data plane mirror app tier 1440 may be configured to make calls to the data plane VCN 1418 but may not be configured to make calls to any entity contained in the control plane VCN 1416. The customer may desire to deploy or otherwise use resources in the data plane VCN 1418 that are provisioned in the control plane VCN 1416, and the data plane mirror app tier 1440 can facilitate the desired deployment, or other usage of resources, of the customer.

In some embodiments, the customer of the IaaS provider can apply filters to the data plane VCN 1418. In this embodiment, the customer can determine what the data plane VCN 1418 can access, and the customer may restrict access to public Internet 1454 from the data plane VCN 1418. The IaaS provider may not be able to apply filters or otherwise control access of the data plane VCN 1418 to any outside networks or databases. Applying filters and controls by the customer onto the data plane VCN 1418, contained in the customer tenancy 1421, can help isolate the data plane VCN 1418 from other customers and from public Internet 1454.

In some embodiments, cloud services 1456 can be called by the service gateway 1436 to access services that may not exist on public Internet 1454, on the control plane VCN 1416, or on the data plane VCN 1418. The connection between cloud services 1456 and the control plane VCN 1416 or the data plane VCN 1418 may not be live or continuous. Cloud services 1456 may exist on a different network owned or operated by the IaaS provider. Cloud services 1456 may be configured to receive calls from the service gateway 1436 and may be configured to not receive calls from public Internet 1454. Some cloud services 1456 may be isolated from other cloud services 1456, and the control plane VCN 1416 may be isolated from cloud services 1456 that may not be in the same region as the control plane VCN 1416. For example, the control plane VCN 1416 may be located in "Region 1," and cloud service "Deployment 13," may be located in Region 1 and in "Region 2." If a call to Deployment 13 is made by the service gateway 1436 contained in the control plane VCN 1416 located in Region 1, the call may be transmitted to Deployment 13 in Region 1. In this example, the control plane VCN 1416, or Deployment 13 in Region 1, may not be communicatively coupled to, or otherwise in communication with, Deployment 13 in Region 2.

Figure 15:
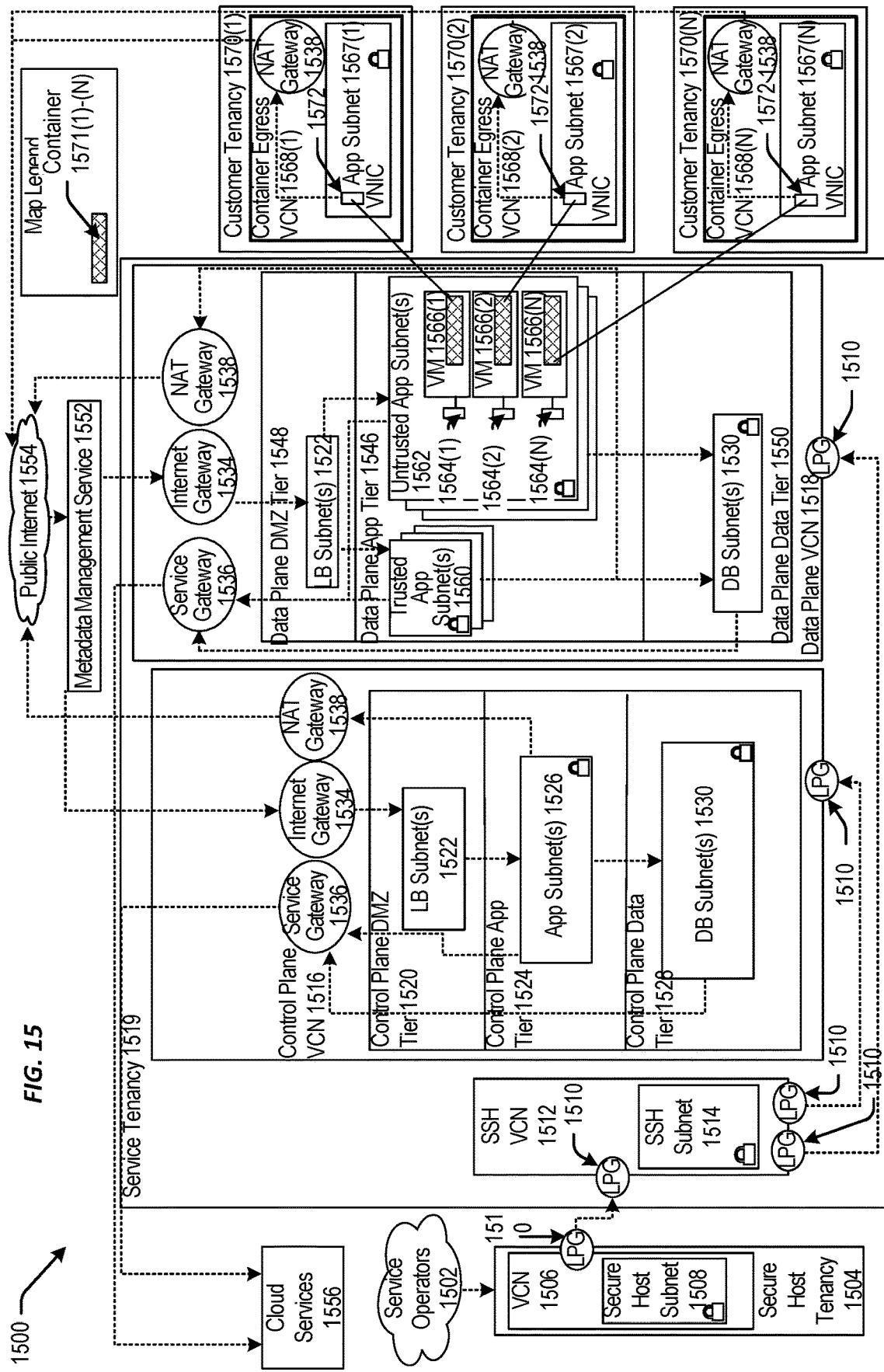
FIG. 15 is a block diagram illustrating another pattern for implementing a cloud infrastructure as a service system, according to at least one embodiment.

FIG. 15 is a block diagram 1500 illustrating another example pattern of an IaaS architecture, according to at least one embodiment. Service operators 1502 (e.g. service operators 1302 of FIG. 13) can be communicatively coupled to a secure host tenancy 1504 (e.g. the secure host tenancy 1304 of FIG. 13) that can include a virtual cloud network (VCN) 1506 (e.g. the VCN 1306 of FIG. 13) and a secure host subnet 1508 (e.g. the secure host subnet 1308 of FIG. 13). The VCN 1506 can include an LPG 1510 (e.g. the LPG 1310 of FIG. 13) that can be communicatively coupled to an SSH VCN 1512 (e.g. the SSH VCN 1312 of FIG. 13) via an LPG 1510 contained in the SSH VCN 1512. The SSH VCN 1512 can include an SSH subnet 1514 (e.g. the SSH subnet 1314 of FIG. 13), and the SSH VCN 1512 can be communicatively coupled to a control plane VCN 1516 (e.g. the control plane VCN 1316 of FIG. 13) via an LPG 1510 contained in the control plane VCN 1516 and to a data plane VCN 1518 (e.g. the data plane 1318 of FIG. 13) via an LPG 1510 contained in the data plane VCN 1518. The control plane VCN 1516 and the data plane VCN 1518 can be contained in a service tenancy 1519 (e.g. the service tenancy 1319 of FIG. 13).

The control plane VCN 1516 can include a control plane DMZ tier 1520 (e.g. the control plane DMZ tier 1320 of FIG. 13) that can include load balancer (LB) subnet(s) 1522 (e.g. LB subnet(s) 1322 of FIG. 13), a control plane app tier 1524 (e.g. the control plane app tier 1324 of FIG. 13) that can include app subnet(s) 1526 (e.g. similar to app subnet(s) 1326 of FIG. 13), a control plane data tier 1528 (e.g. the control plane data tier 1328 of FIG. 13) that can include DB subnet(s) 1530. The LB subnet(s) 1522 contained in the control plane DMZ tier 1520 can be communicatively coupled to the app subnet(s) 1526 contained in the control plane app tier 1524 and to an Internet gateway 1534 (e.g. the Internet gateway 1334 of FIG. 13) that can be contained in the control plane VCN 1516, and the app subnet(s) 1526 can be communicatively coupled to the DB subnet(s) 1530 contained in the control plane data tier 1528 and to a service gateway 1536 (e.g. the service gateway of FIG. 13) and a network address translation (NAT) gateway 1538 (e.g. the NAT gateway 1338 of FIG. 13). The control plane VCN 1516 can include the service gateway 1536 and the NAT gateway 1538.

The data plane VCN 1518 can include a data plane app tier 1546 (e.g. the data plane app tier 1346 of FIG. 13), a data plane DMZ tier 1548 (e.g. the data plane DMZ tier 1348 of FIG. 13), and a data plane data tier 1550 (e.g. the data plane data tier 1350 of FIG. 13). The data plane DMZ tier 1548 can include LB subnet(s) 1522 that can be communicatively coupled to trusted app subnet(s) 1560 and untrusted app subnet(s) 1562 of the data plane app tier 1546 and the Internet gateway 1534 contained in the data plane VCN 1518. The trusted app subnet(s) 1560 can be communicatively coupled to the service gateway 1536 contained in the data plane VCN 1518, the NAT gateway 1538 contained in the data plane VCN 1518, and DB subnet(s) 1530 contained in the data plane data tier 1550. The untrusted app subnet(s) 1562 can be communicatively coupled to the service gateway 1536 contained in the data plane VCN 1518 and DB subnet(s) 1530 contained in the data plane data tier 1550. The data plane data tier 1550 can include DB subnet(s) 1530 that can be communicatively coupled to the service gateway 1536 contained in the data plane VCN 1518.

The untrusted app subnet(s) 1562 can include one or more primary VNICs 1564(1)-(N) that can be communicatively coupled to tenant virtual machines (VMs) 1566(1)-(N). Each tenant VM 1566(1)-(N) can be communicatively coupled to a respective app subnet 1567(1)-(N) that can be contained in respective container egress VCNs 1568(1)-(N) that can be contained in respective customer tenancies 1570(1)-(N). Respective secondary VNICs 1572(1)-(N) can facilitate communication between the untrusted app subnet(s) 1562 contained in the data plane VCN 1518 and the app subnet contained in the container egress VCNs 1568(1)-(N). Each container egress VCNs 1568(1)-(N) can include a NAT gateway 1538 that can be communicatively coupled to public Internet 1554 (e.g. public Internet 1354 of FIG. 13).

The Internet gateway 1534 contained in the control plane VCN 1516 and contained in the data plane VCN 1518 can be communicatively coupled to a metadata management service 1552 (e.g. the metadata management system 1352 of FIG. 13) that can be communicatively coupled to public Internet 1554. Public Internet 1554 can be communicatively coupled to the NAT gateway 1538 contained in the control plane VCN 1516 and contained in the data plane VCN 1518. The service gateway 1536 contained in the control plane VCN 1516 and contained in the data plane VCN 1518 can be communicatively couple to cloud services 1556.

In some embodiments, the data plane VCN 1518 can be integrated with customer tenancies 1570. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane tier app 1546. Code to run the function may be executed in the VMs 1566(1)-(N), and the code may not be configured to run anywhere else on the data plane VCN 1518. Each VM 1566(1)-(N) may be connected to one customer tenancy 1570. Respective containers 1571(1)-(N) contained in the VMs 1566(1)-(N) may be configured to run the code. In this case, there can be a dual isolation (e.g., the containers 1571(1)-(N) running code, where the containers 1571(1)-(N) may be contained in at least the VM 1566(1)-(N) that are contained in the untrusted app subnet(s) 1562), which may help prevent incorrect or otherwise undesirable code from damaging the network of the IaaS provider or from damaging a network of a different customer. The containers 1571 (1)-(N) may be communicatively coupled to the customer tenancy 1570 and may be configured to transmit or receive data from the customer tenancy 1570. The containers 1571 (1)-(N) may not be configured to transmit or receive data from any other entity in the data plane VCN 1518. Upon completion of running the code, the IaaS provider may kill or otherwise dispose of the containers 1571(1)-(N).

In some embodiments, the trusted app subnet(s) 1560 may run code that may be owned or operated by the IaaS provider. In this embodiment, the trusted app subnet(s) 1560 may be communicatively coupled to the DB subnet(s) 1530 and be configured to execute CRUD operations in the DB subnet(s) 1530. The untrusted app subnet(s) 1562 may be communicatively coupled to the DB subnet(s) 1530, but in this embodiment, the untrusted app subnet(s) may be configured to execute read operations in the DB subnet(s) 1530. The containers 1571(1)-(N) that can be contained in the VM 1566(1)-(N) of each customer and that may run code from the customer may not be communicatively coupled with the DB subnet(s) 1530.

In other embodiments, the control plane VCN 1516 and the data plane VCN 1518 may not be directly communicatively coupled. In this embodiment, there may be no direct communication between the control plane VCN 1516 and the data plane VCN 1518. However, communication can occur indirectly through at least one method. An LPG 1510 may be established by the IaaS provider that can facilitate communication between the control plane VCN 1516 and the data plane VCN 1518. In another example, the control plane VCN 1516 or the data plane VCN 1518 can make a call to cloud services 1556 via the service gateway 1536. For example, a call to cloud services 1556 from the control plane VCN 1516 can include a request for a service that can communicate with the data plane VCN 1518.

Figure 16:
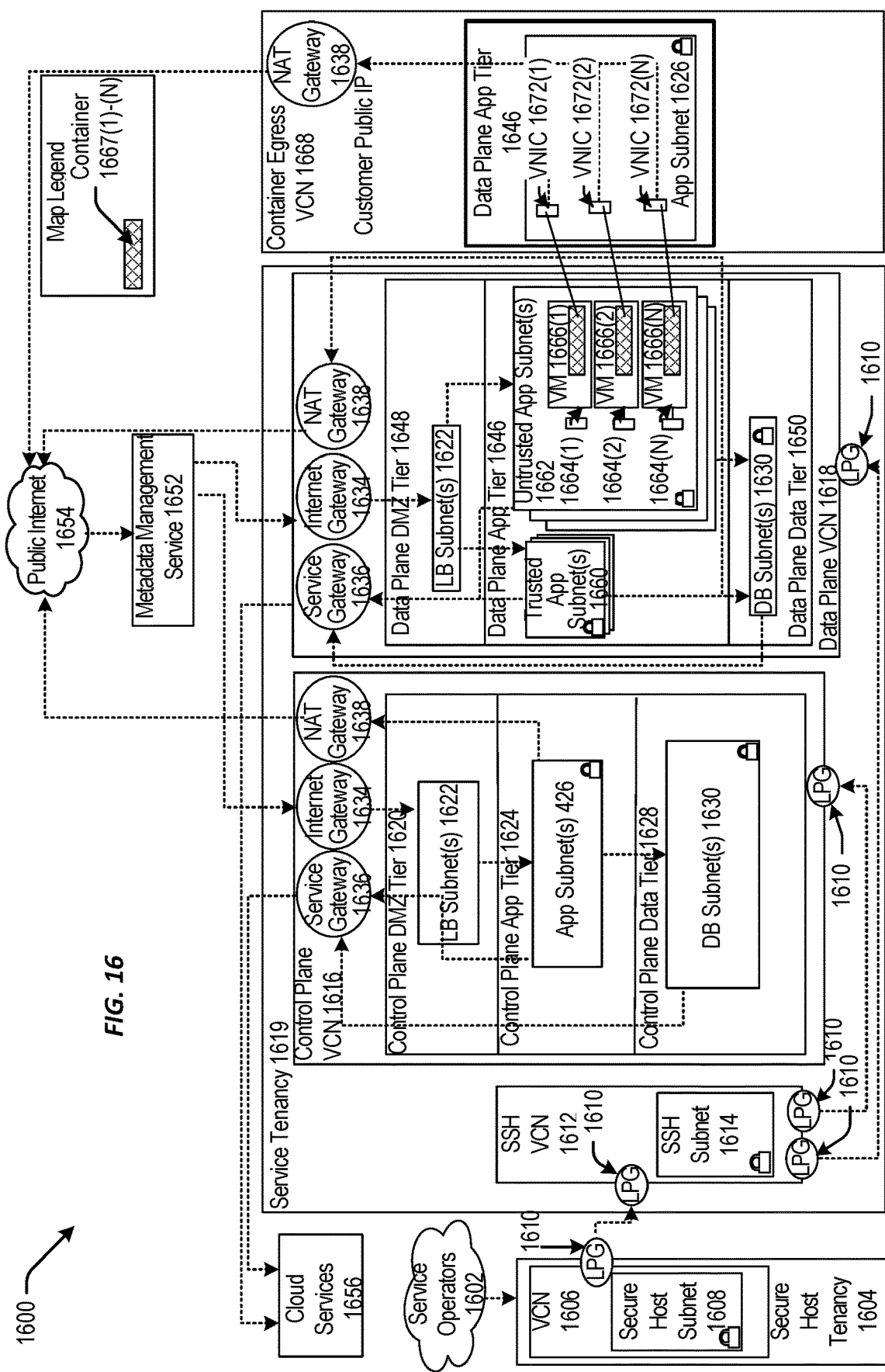
FIG. 16 is a block diagram illustrating another pattern for implementing a cloud infrastructure as a service system, according to at least one embodiment.

FIG. 16 is a block diagram 1600 illustrating another example pattern of an IaaS architecture, according to at least one embodiment. Service operators 1602 (e.g. service operators 1302 of FIG. 13) can be communicatively coupled to a secure host tenancy 1604 (e.g. the secure host tenancy 1304 of FIG. 13) that can include a virtual cloud network (VCN) 1606 (e.g. the VCN 1306 of FIG. 13) and a secure host subnet 1608 (e.g. the secure host subnet 1308 of FIG. 13). The VCN 1606 can include an LPG 1610 (e.g. the LPG 1310 of FIG. 13) that can be communicatively coupled to an SSH VCN 1612 (e.g. the SSH VCN 1312 of FIG. 13) via an LPG 1610 contained in the SSH VCN 1612. The SSH VCN 1612 can include an SSH subnet 1614 (e.g. the SSH subnet 1314 of FIG. 13), and the SSH VCN 1612 can be communicatively coupled to a control plane VCN 1616 (e.g. the control plane VCN 1316 of FIG. 13) via an LPG 1610 contained in the control plane VCN 1616 and to a data plane VCN 1618 (e.g. the data plane 1318 of FIG. 13) via an LPG 1610 contained in the data plane VCN 1618. The control plane VCN 1616 and the data plane VCN 1618 can be contained in a service tenancy 1619 (e.g. the service tenancy 1319 of FIG. 13).

The control plane VCN 1616 can include a control plane DMZ tier 1620 (e.g. the control plane DMZ tier 1320 of FIG. 13) that can include LB subnet(s) 1622 (e.g. LB subnet(s) 1322 of FIG. 13), a control plane app tier 1624 (e.g. the control plane app tier 1324 of FIG. 13) that can include app subnet(s) 1626 (e.g. app subnet(s) 1326 of FIG. 13), a control plane data tier 1628 (e.g. the control plane data tier 1328 of FIG. 13) that can include DB subnet(s) 1630 (e.g. DB subnet(s) 1530 of FIG. 15). The LB subnet(s) 1622 contained in the control plane DMZ tier 1620 can be communicatively coupled to the app subnet(s) 1626 contained in the control plane app tier 1624 and to an Internet gateway 1634 (e.g. the Internet gateway 1334 of FIG. 13) that can be contained in the control plane VCN 1616, and the app subnet(s) 1626 can be communicatively coupled to the DB subnet(s) 1630 contained in the control plane data tier 1628 and to a service gateway 1636 (e.g. the service gateway of FIG. 13) and a network address translation (NAT) gateway 1638 (e.g. the NAT gateway 1338 of FIG. 13). The control plane VCN 1616 can include the service gateway 1636 and the NAT gateway 1638.

The data plane VCN 1618 can include a data plane app tier 1646 (e.g. the data plane app tier 1346 of FIG. 13), a data plane DMZ tier 1648 (e.g. the data plane DMZ tier 1348 of FIG. 13), and a data plane data tier 1650 (e.g. the data plane data tier 1350 of FIG. 13). The data plane DMZ tier 1648 can include LB subnet(s) 1622 that can be communicatively coupled to trusted app subnet(s) 1660 (e.g. trusted app subnet(s) 1560 of FIG. 15) and untrusted app subnet(s) 1662 (e.g. untrusted app subnet(s) 1562 of FIG. 15) of the data plane app tier 1646 and the Internet gateway 1634 contained in the data plane VCN 1618. The trusted app subnet(s) 1660 can be communicatively coupled to the service gateway 1636 contained in the data plane VCN 1618, the NAT gateway 1638 contained in the data plane VCN 1618, and DB subnet(s) 1630 contained in the data plane data tier 1650. The untrusted app subnet(s) 1662 can be communicatively coupled to the service gateway 1636 contained in the data plane VCN 1618 and DB subnet(s) 1630 contained in the data plane data tier 1650. The data plane data tier 1650 can include DB subnet(s) 1630 that can be communicatively coupled to the service gateway 1636 contained in the data plane VCN 1618.

The untrusted app subnet(s) 1662 can include primary VNICs 1664(1)-(N) that can be communicatively coupled to tenant virtual machines (VMs) 1666(1)-(N) residing within the untrusted app subnet(s) 1662. Each tenant VM 1666(1)-(N) can run code in a respective container 1667(1)-(N), and be communicatively coupled to an app subnet 1626 that can be contained in a data plane app tier 1646 that can be contained in a container egress VCN 1668. Respective secondary VNICs 1672(1)-(N) can facilitate communication between the untrusted app subnet(s) 1662 contained in the data plane VCN 1618 and the app subnet contained in the container egress VCN 1668. The container egress VCN can include a NAT gateway 1638 that can be communicatively coupled to public Internet 1654 (e.g. public Internet 1354 of FIG. 13).

The Internet gateway 1634 contained in the control plane VCN 1616 and contained in the data plane VCN 1618 can be communicatively coupled to a metadata management service 1652 (e.g. the metadata management system 1352 of FIG. 13) that can be communicatively coupled to public Internet 1654. Public Internet 1654 can be communicatively coupled to the NAT gateway 1638 contained in the control plane VCN 1616 and contained in the data plane VCN 1618. The service gateway 1636 contained in the control plane VCN 1616 and contained in the data plane VCN 1618 can be communicatively couple to cloud services 1656.

In some examples, the pattern illustrated by the architecture of block diagram 1600 of FIG. 16 may be considered an exception to the pattern illustrated by the architecture of block diagram 1500 of FIG. 15 and may be desirable for a customer of the IaaS provider if the IaaS provider cannot directly communicate with the customer (e.g., a disconnected region). The respective containers 1667(1)-(N) that are contained in the VMs 1666(1)-(N) for each customer can be accessed in real-time by the customer. The containers 1667(1)-(N) may be configured to make calls to respective secondary VNICs 1672(1)-(N) contained in app subnet(s) 1626 of the data plane app tier 1646 that can be contained in the container egress VCN 1668. The secondary VNICs 1672(1)-(N) can transmit the calls to the NAT gateway 1638 that may transmit the calls to public Internet 1654. In this example, the containers 1667(1)-(N) that can be accessed in real-time by the customer can be isolated from the control plane VCN 1616 and can be isolated from other entities contained in the data plane VCN 1618. The containers 1667(1)-(N) may also be isolated from resources from other customers.

In other examples, the customer can use the containers 1667(1)-(N) to call cloud services 1656. In this example, the customer may run code in the containers 1667(1)-(N) that requests a service from cloud services 1656. The containers 1667(1)-(N) can transmit this request to the secondary VNICs 1672(1)-(N) that can transmit the request to the NAT gateway that can transmit the request to public Internet 1654. Public Internet 1654 can transmit the request to LB subnet(s) 1622 contained in the control plane VCN 1616 via the Internet gateway 1634. In response to determining the request is valid, the LB subnet(s) can transmit the request to app subnet(s) 1626 that can transmit the request to cloud services 1656 via the service gateway 1636.

It should be appreciated that IaaS architectures 1300, 1400, 1500, 1600 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 17:
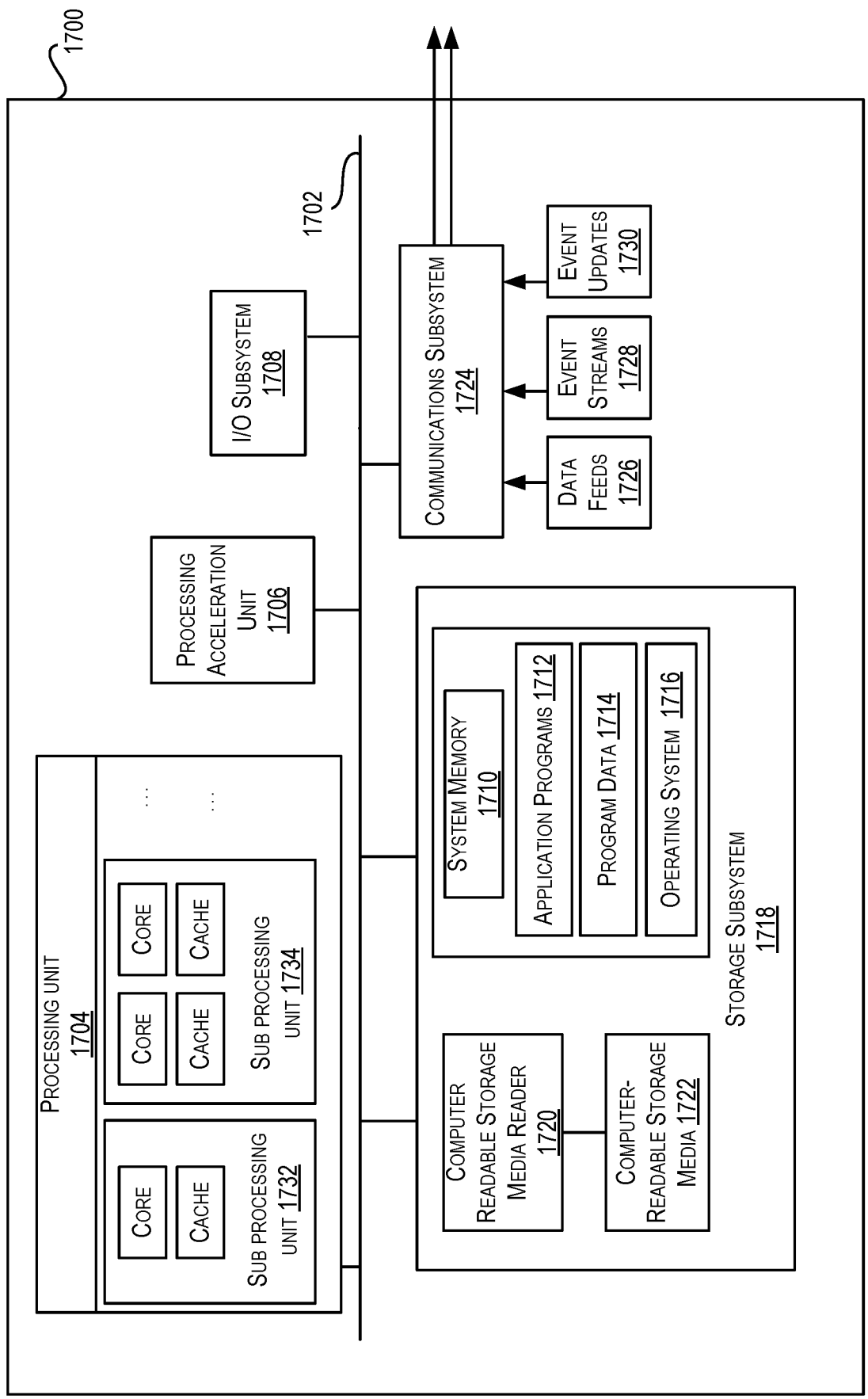
FIG. 17 is a block diagram illustrating an example computer system, according to at least one embodiment.

FIG. 17 illustrates an example computer system 1700, in which various embodiments may be implemented. The system 1700 may be used to implement any of the computer systems described above. As shown in the figure, computer system 1700 includes a processing unit 1704 that communicates with a number of peripheral subsystems via a bus subsystem 1702. These peripheral subsystems may include a processing acceleration unit 1706, an I/O subsystem 1708, a storage subsystem 1718 and a communications subsystem 1724. Storage subsystem 1718 includes tangible computer-readable storage media 1722 and a system memory 1710.

Bus subsystem 1702 provides a mechanism for letting the various components and subsystems of computer system 1700 communicate with each other as intended. Although bus subsystem 1702 is shown schematically as a single bus, alternative embodiments of the bus subsystem may utilize multiple buses. Bus subsystem 1702 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1704, which can be implemented as one or more integrated circuits (e.g., a conventional microprocessor or microcontroller), controls the operation of computer system 1700. One or more processors may be included in processing unit 1704. These processors may include single core or multicore processors. In certain embodiments, processing unit 1704 may be implemented as one or more independent processing units 1732 and/or 1734 with single or multicore processors included in each processing unit. In other embodiments, processing unit 1704 may also be implemented as a quad-core processing unit formed by integrating two dual-core processors into a single chip.

In various embodiments, processing unit 1704 can execute a variety of programs in response to program code and can maintain multiple concurrently executing programs or processes. At any given time, some or all of the program code to be executed can be resident in processor(s) 1704 and/or in storage subsystem 1718. Through suitable programming, processor(s) 1704 can provide various functionalities described above. Computer system 1700 may additionally include a processing acceleration unit 1706, which can include a digital signal processor (DSP), a special-purpose processor, and/or the like.

I/O subsystem 1708 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1700 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1700 may comprise a storage subsystem 1718 that provides a tangible non-transitory computer-readable storage medium for storing software and data constructs that provide the functionality of the embodiments described in this disclosure. The software can include programs, code modules, instructions, scripts, etc., that when executed by one or more cores or processors of processing unit 1704 provide the functionality described above. Storage subsystem 1718 may also provide a repository for storing data used in accordance with the present disclosure.

As depicted in the example in FIG. 17, storage subsystem 1718 can include various components including a system memory 1710, computer-readable storage media 1722, and a computer readable storage media reader 1720. System memory 1710 may store program instructions that are loadable and executable by processing unit 1704. System memory 1710 may also store data that is used during the execution of the instructions and/or data that is generated during the execution of the program instructions. Various different kinds of programs may be loaded into system memory 1710 including but not limited to client applications, Web browsers, mid-tier applications, relational database management systems (RDBMS), virtual machines, containers, etc.

System memory 1710 may also store an operating system 1716. Examples of operating system 1716 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, and Palm® OS operating systems. In certain implementations where computer system 1700 executes one or more virtual machines, the virtual machines along with their guest operating systems (GOSs) may be loaded into system memory 1710 and executed by one or more processors or cores of processing unit 1704.

System memory 1710 can come in different configurations depending upon the type of computer system 1700. For example, system memory 1710 may be volatile memory (such as random access memory (RAM)) and/or non-volatile memory (such as read-only memory (ROM), flash memory, etc.) Different types of RAM configurations may be provided including a static random access memory (SRAM), a dynamic random access memory (DRAM), and others. In some implementations, system memory 1710 may include a basic input/output system (BIOS) containing basic routines that help to transfer information between elements within computer system 1700, such as during start-up.

Computer-readable storage media 1722 may represent remote, local, fixed, and/or removable storage devices plus storage media for temporarily and/or more permanently containing, storing, computer-readable information for use by computer system 1700 including instructions executable by processing unit 1704 of computer system 1700.

Computer-readable storage media 1722 can include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media.

By way of example, computer-readable storage media 1722 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1722 may include, but is not limited to, Zip® drives, flash memory cards, universal serial bus (USB) flash drives, secure digital (SD) cards, DVD disks, digital video tape, and the like. Computer-readable storage media 1722 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1700.

Machine-readable instructions executable by one or more processors or cores of processing unit 1704 may be stored on a non-transitory computer-readable storage medium. A non-transitory computer-readable storage medium can include physically tangible memory or storage devices that include volatile memory storage devices and/or non-volatile storage devices. Examples of non-transitory computer-readable storage medium include magnetic storage media (e.g., disk or tapes), optical storage media (e.g., DVDs, CDs), various types of RAM, ROM, or flash memory, hard drives, floppy drives, detachable memory drives (e.g., USB drives), or other type of storage device.

Communications subsystem 1724 provides an interface to other computer systems and networks. Communications subsystem 1724 serves as an interface for receiving data from and transmitting data to other systems from computer system 1700. For example, communications subsystem 1724 may enable computer system 1700 to connect to one or more devices via the Internet. In some embodiments communications subsystem 1724 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 1502.11 family standards, or other mobile communication technologies, or any combination thereof), global positioning system (GPS) receiver components, and/or other components. In some embodiments communications subsystem 1724 can provide wired network connectivity (e.g., Ethernet) in addition to or instead of a wireless interface.

In some embodiments, communications subsystem 1724 may also receive input communication in the form of structured and/or unstructured data feeds 1726, event streams 1728, event updates 1730, and the like on behalf of one or more users who may use computer system 1700.

By way of example, communications subsystem 1724 may be configured to receive data feeds 1726 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1724 may also be configured to receive data in the form of continuous data streams, which may include event streams 1728 of real-time events and/or event updates 1730, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1724 may also be configured to output the structured and/or unstructured data feeds 1726, event streams 1728, event updates 1730, and the like to one or more databases that may be in communication with one or more streaming data source computers coupled to computer system 1700.

Computer system 1700 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1700 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A method for identifying dependencies between capabilities of a cloud computing environment under build, the method comprising:
    identifying, by a cloud infrastructure orchestration service from one or more configuration files, a collective set of capabilities individually relating to services or applications to be bootstrapped by the cloud infrastructure orchestration service within the cloud computing environment under build;
    identifying, by the cloud infrastructure orchestration service for each respective capability of the collective set of capabilities, a first set of capabilities on which publishing the respective capability depends; and
    generating, by the cloud infrastructure orchestration service, a visualization that includes:
        a first portion specifying a first subset of capabilities of the collective set of capabilities that depend on no unpublished capabilities based at least in part on identifying the first set of capabilities; and
        a second portion specifying a second subset of capabilities of the collective set of capabilities that depend on one or more currently unpublished capabilities; and
    updating, by the cloud infrastructure orchestration service, the first portion or the second portion of the visualization based at least in part on identifying one or more updates to a publication status of one or more individual capabilities of the collective set of capabilities.

2. The method of claim 1, wherein the second portion further specifies a respective number of unpublished capabilities for each capability, publication of each capability being dependent on publication of the respective number of unpublished capabilities.

3. The method of claim 1, wherein the first portion or the second portion of the visualization comprise respective tables that indicate, for each specified capability in the first portion or the second portion a corresponding flock, and a corresponding region.

4. The method of claim 1, wherein the one or more updates to the publication status of the one or more individual capabilities of the collective set of capabilities are identified from capabilities data obtained from a capabilities service, and wherein updating the first portion or the second portion of the visualization comprises:
    generating an updated first portion that identifies a third subset of capabilities of the collective set of capabilities that depend on no unpublished capabilities according to the one or more updates; or
    generating an updated second portion that identifies a fourth subset of capabilities of the collective set of capabilities that depend on a set of currently unpublished capabilities according to the one or more updates.

5. The method of claim 4, wherein a first capability initially included in the second portion of the visualization is newly included in the updated first portion responsive to identifying, from the one or more updates, that a second capability on which the first capability depends has published.

6. The method of claim 1, further comprising assigning a ranking to the second subset of capabilities based at least in part on identifying a number of the first set of capabilities corresponding to each of the second subset of capabilities.

7. The method of claim 6, wherein the ranking is generated based at least in part on identifying, for each respective capability of the collective set of capabilities, a second set of capabilities that are capable of being published responsive to publishing the respective capability, wherein a second visualization is generated to depict the second set of capabilities.

8. A cloud-computing system, comprising:
one or more processors; and
one or more memories storing computer-executable instructions that, when executed by the one or more processors, cause the one or more processors to:
identify, from one or more configuration files, a collective set of capabilities individually relating to services or applications to be bootstrapped by a cloud infrastructure orchestration service within a cloud computing environment under build;
identify, for each respective capability of the collective set of capabilities, a first set of capabilities on which publishing the respective capability depends; and
generate a visualization that includes:
a first portion specifying a first subset of capabilities of the collective set of capabilities that depend on no unpublished capabilities based at least in part on identifying the first set of capabilities; and
a second portion specifying a second subset of capabilities of the collective set of capabilities that depend on one or more currently unpublished capabilities; and
update the first portion or the second portion of the visualization based at least in part on identifying one or more updates to a publication status of one or more individual capabilities of the collective set of capabilities.

9. The cloud-computing system of claim 8, wherein the second portion further specifies a respective number of unpublished capabilities for each capability, publication of each capability being dependent on publication of the respective number of unpublished capabilities.

10. The cloud-computing system of claim 8, wherein the first portion or the second portion of the visualization comprise respective tables that indicate, for each specified capability in the first portion or the second portion a corresponding flock, and a corresponding region.

11. The cloud-computing system of claim 8, wherein the one or more updates to the publication status are identified from capabilities data obtained from a capabilities service, and wherein executing the instructions further causes the one or more processors to:
generate an updated first portion that identifies a third subset of capabilities of the collective set of capabilities that depend on no unpublished capabilities according to the one or more updates; or
generate an updated second portion that identifies a fourth subset of capabilities of the collective set of capabilities that depend on a set of currently unpublished capabilities according to the one or more updates.

12. The cloud-computing system of claim 11, wherein a first capability initially included in the second portion of the visualization is newly included in the updated first portion responsive to identifying, from the one or more updates, that a second capability on which the first capability depends has published.

13. The cloud-computing system of claim 8, wherein executing the instructions further causes the one or more processors to assign a ranking to the second subset of capabilities based at least in part on identifying a number of the first set of capabilities corresponding to each of the second subset of capabilities.

14. The cloud-computing system of claim 13, wherein the ranking is generated based at least in part on identifying, for each respective capability of the collective set of capabilities, a second set of capabilities that are capable of being published responsive to publishing the respective capability, wherein a second visualization is generated to depict the second set of capabilities.

15. A non-transitory computer-readable storage medium storing computer-executable instructions that, when executed by one or more processors of a cloud infrastructure orchestration service, causes the one or more processors to:
identify, from one or more configuration files, a collective set of capabilities individually relating to services or applications to be bootstrapped by the cloud infrastructure orchestration service within a cloud computing environment under build;
identify, for each respective capability of the collective set of capabilities, a first set of capabilities on which publishing the respective capability depends; and
generate a visualization that includes:
a first portion specifying a first subset of capabilities of the collective set of capabilities that depend on no unpublished capabilities based at least in part on identifying the first set of capabilities; and
a second portion specifying a second subset of capabilities of the collective set of capabilities that depend on one or more currently unpublished capabilities; and
update the first portion or the second portion of the visualization based at least in part on identifying one or more updates to a publication status of one or more individual capabilities of the collective set of capabilities.

16. The non-transitory computer-readable storage medium of claim 15, wherein the second portion further specifies a respective number of unpublished capabilities for each capability, publication of each capability being dependent on publication of the respective number of unpublished capabilities.

17. The non-transitory computer-readable storage medium of claim 15, wherein the first portion or the second portion of the visualization comprise respective tables that indicate, for each specified capability in the first portion or the second portion a corresponding flock, and a corresponding region.

18. The non-transitory computer-readable storage medium of claim 15, wherein the one or more updates to the publication status are identified from capabilities data obtained from a capabilities service, and wherein executing the instructions further cause the one or more processors to:
generate an updated first portion that identifies a third subset of capabilities of the collective set of capabilities that depend on no unpublished capabilities according to the one or more updates; or
generate an updated second portion that identifies a fourth subset of capabilities of the collective set of capabilities that depend on a set of currently unpublished capabilities according to the one or more updates.

19. The non-transitory computer-readable storage medium of claim 18, wherein a first capability initially included in the second portion of the visualization is newly included in the updated first portion responsive to identifying, from the one or more updates, that a second capability on which the first capability depends has published.

20. The non-transitory computer-readable storage medium of claim 19, wherein executing the instructions further causes the one or more processors to assign a ranking to the second subset of capabilities based at least in part on identifying a number of the first set of capabilities corresponding to each of the second subset of capabilities, wherein the ranking is generated based at least in part on identifying, for each respective capability of the collective set of capabilities, a second set of capabilities that are capable of being published responsive to publishing the respective capability, wherein a second visualization is generated to depict the second set of capabilities.

* * * * *